(12) United States Patent
Maniatopoulos et al.

(10) Patent No.: US 12,428,024 B2
(45) Date of Patent: Sep. 30, 2025

(54) SYSTEM FOR REMOTELY RELOCATING AUTONOMOUS VEHICLES USING MULTI-POINT MANEUVERS

(71) Applicant: GM Cruise Holdings LLC, San Francisco, CA (US)

(72) Inventors: Spyros Maniatopoulos, Pacifica, CA (US); Juan Fasola, San Francisco, CA (US); Xiaoyu Zhou, San Francisco, CA (US); Arthur L. Gillespie, III, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 152 days.

(21) Appl. No.: 18/336,690

(22) Filed: Jun. 16, 2023

(65) Prior Publication Data

US 2024/0416952 A1 Dec. 19, 2024

(51) Int. Cl.
*B60W 60/00* (2020.01)
*G05D 1/00* (2006.01)

(52) U.S. Cl.
CPC ......... *B60W 60/001* (2020.02); *G05D 1/0038* (2013.01); *G05D 1/0044* (2013.01); *B60W 2420/403* (2013.01); *B60W 2556/45* (2020.02)

(58) Field of Classification Search
CPC ........... B60W 60/001; B60W 2556/45; B60W 2420/403; G05D 1/0038; G05D 1/0044
See application file for complete search history.

(56) References Cited

U.S. PATENT DOCUMENTS

| 11,644,830 B1* | 5/2023 | Gate | G05D 1/0038 |
| | | | 701/2 |
| 2021/0148726 A1* | 5/2021 | Ostafew | G05D 1/227 |
| 2022/0215671 A1* | 7/2022 | Lynam | G06V 20/58 |

FOREIGN PATENT DOCUMENTS

CN 112579715 B * 4/2023 ......... G06F 16/2393

* cited by examiner

*Primary Examiner* — Vivek D Koppikar
*Assistant Examiner* — Jeffrey R Chalhoub
(74) *Attorney, Agent, or Firm* — CANTOR COLBURN LLP

(57) ABSTRACT

It may be desirable for a remote advisor to request an AV to relocate to a target relocation pose. In some cases, reaching a target relocation pose may involve a multi-point maneuver. Ability to perform relocation that involves a multi-point maneuver offers flexibility for the AV to maneuver around double-parked vehicles, to avoid obstacles, to aid a reroute when a route becomes unnavigable, etc. To support relocation that involves performing multi-point maneuvers, the planning stack may be modified to include a motion planner that can generate output plans that involve the AV going forward and in reverse. Moreover, the vehicle control stack may publish vehicle controls information as feedback information to the motion planner and the remote requestor, so that the motion planner and the remote requestor can be informed of the state of the AV.

19 Claims, 18 Drawing Sheets

SYSTEM FOR REMOTELY RELOCATING AUTONOMOUS VEHICLES USING MULTI-POINT MANEUVERS

BACKGROUND

Technical Field

The present disclosure generally relates to autonomous vehicles and, more specifically, to remote relocation systems for autonomous vehicles (AVs).

Introduction

AVs also known as self-driving cars, and driverless vehicles, may be vehicles that use multiple sensors to sense the environment and move without human input. Automation technology in autonomous vehicles may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
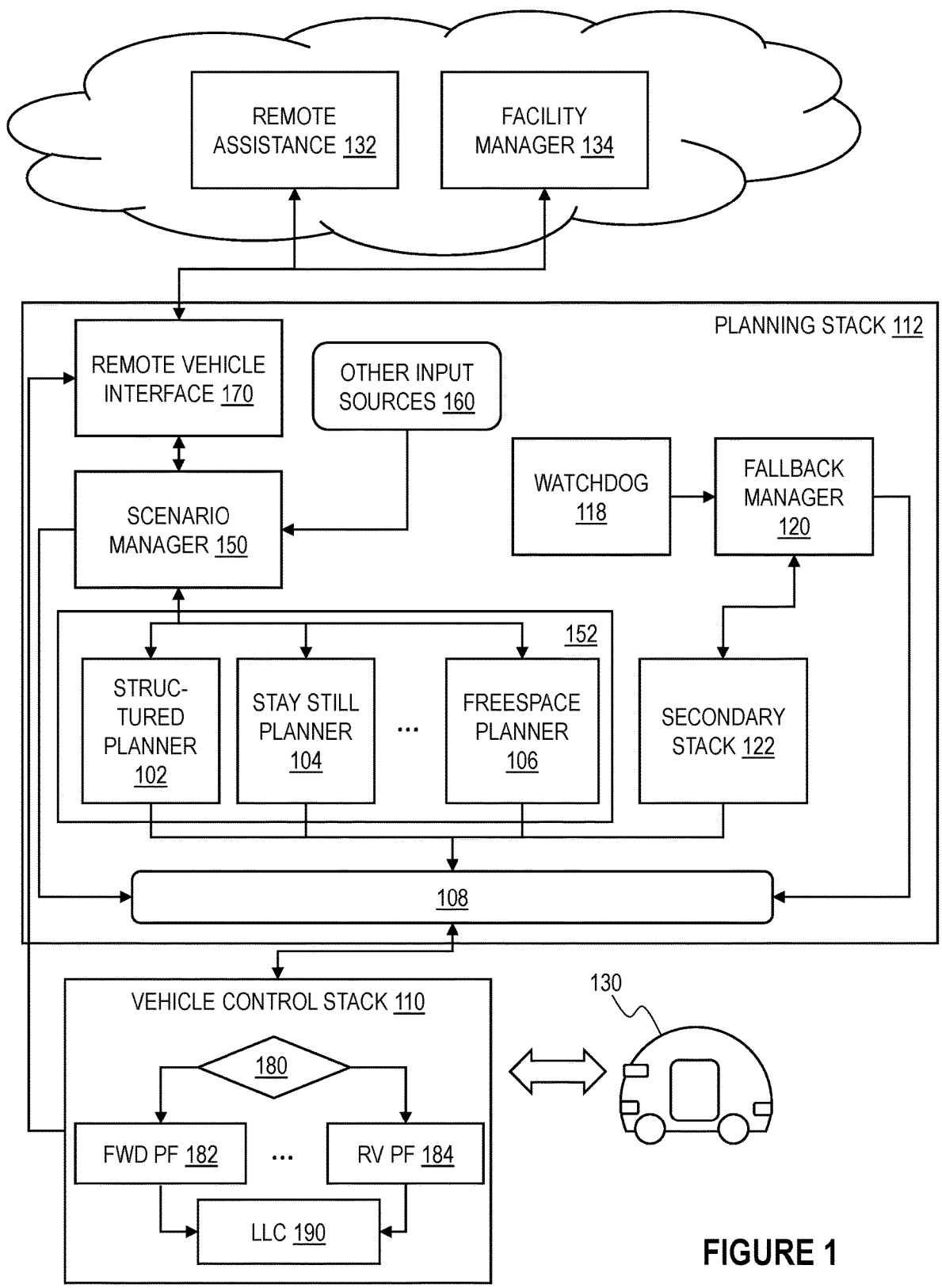
FIG. 1 illustrates exemplary remote requestors, a planning stack, and a vehicle control stack, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Introduction to AV Stack

AVs can provide many benefits. For instance, AVs may have the potential to transform urban living by offering an opportunity for efficient, accessible, and affordable transportation. An AV may be equipped with various sensors to sense the environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. The AV may create plans based on map information, localization, data from perception, and data from prediction. Subsequently, plans can be sent to the vehicle) control stack to control the AV (e.g., for steering, accelerating, decelerating, braking, etc.) according to the plan.

In some cases, the AV stack (sometimes referred to as the software stack of a vehicle) may include a layered arrangement of stacks, including stacks such as a perception stack, a prediction stack, a planning stack, and a vehicle control stack. The perception stack may generate tracked objects and inferences about the tracked objects. The prediction stack may generate predictions of movement or kinematics of the track objects. The planning stack may generate one or more plans and transmit the one or more plans to the vehicle control stack. The vehicle control stack can process a plan and generate commands to vehicle actuators to cause the vehicle to execute the plan (e.g., cause the vehicle to use appropriate vehicle signal lights, steer, drive, and follow the trajectory).

A plan can include several components, such as one or more trajectories, a target gear request, a blinker light request, a hazard light request, a braking request, and a honking request. A plan can include requests or instructions (e.g., software instructions) for vehicle controls in addition to one or more (reference) trajectories or paths. In some cases, a plan can include multiple segments or multiple parts. A segment of a plan can include a portion of the overall trajectory, and a subset of the various vehicle control requests (e.g., target gear request, blinker light request, hazard light request, braking request, and honking request) corresponding to the segment of the plan.

A trajectory or path can include a contiguous line that connects the starting point/pose of the vehicle and the end point/pose of the vehicle. A pose can include the coordinate position of the vehicle and the orientation or heading of the vehicle. The contiguous line may be defined within a two-dimensional representation of the driving surface or in a three-dimensional representation of the environment surrounding the vehicle. The line may have a corresponding length. Different portions of the contiguous line may have different curvatures. The line may have an associated directionality. A trajectory may be multidimensional. Besides including a line, a trajectory may include higher order derivatives such as velocity, acceleration, curvature, curvature rate, etc.

The operations of perception, prediction, planning, and control of an AV may be implemented using a combination of hardware and software components. For instance, an AV stack performing the perception, prediction, planning, and control may be implemented as software code or firmware code. The AV stack (the software and/or firmware code) may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network.

Using a Freespace Planner for Remote Relocation

The planning stack may be designed to operate under a wide range of diverse scenarios in the real-world. Also, the planning stack may be designed to generate output plans differently in response to the diverse scenarios. One paradigm for implementing a planning stack is to provide a number of different motion planners that are specialized in generating output plans for completing different tasks or achieving different goals. The motion planners may generate output plans based on different sets of constraints. Constraints may be rules or limitations that are applied by a motion planner when the motion planner is searching for or determining a feasible output plan or path. The rules or limitations may impact what is considered a feasible output plan or path. The rules or limitations may impact the available output plans or path to choose from when searching for a feasible, optimal output plan or path. Constraints may include search constraints of the motion planner.

In some cases, a single motion planner would be in control of the AV at a given point in time. Depending on the task to be performed and/or whether the AV is in a degraded state, the control of the AV may be exercised by a motion planner dedicated to performing the task or a motion planner that is to be used when the AV is in a degraded state. A degraded state can mean that a portion of the AV may not be operating as expected or normally. An AV may be in one of several degraded states, where operational status may differ between different degraded states (extent of degradation in operation may differ). Sometimes, control of the AV can be transitioned or transferred between different motion planners. By design, the different motion planners are not necessarily aware of the other planners.

During normal driving, the AV may utilize a structured planner that has strict constraints. The structured planner may take into account semantic map information (e.g., lane information, curb information, etc.), and strictly adhere to lane boundaries, road boundaries, or curb boundaries. The structured planner may have buffer constraints that prevent the AV from being able to drive through narrow gaps. The structured planner may not be able to produce a plan if there are flickering objects and could prevent the AV from navigating around the flickering objects.

It may be desirable for a remote assistance agent or personnel (referred herein as advisor or remote advisor) to request an autonomous vehicle to relocate to a target relocation pose using a freespace planner that has fewer constraints than the structured planner that is used for normal driving. For example, the autonomous vehicle may be stuck because the structured planner is unable to produce an output plan to the next target pose, due to the limitations or constraints of the structured planner. The freespace planner, separate from the structured planner, can generate and produce output plans based on different constraints. The freespace planner may search for the shortest collision-free path from the AV's current pose to a target pose within the freespace. The freespace planner may treat certain areas, except for obstacles (or occupied space), as drivable areas or freespace, even if the areas are not considered drivable if semantic map information was taken into account. Therefore, the freespace planner may have an opportunity to generate an output plan to help the AV become unstuck.

To offer remote access to relocation of an AV, the autonomous vehicle planning stack can include a remote vehicle interface. The remote vehicle interface can serve as the application programming interface for remote requestors such as a remote assistance platform, to request relocation of the autonomous vehicle. The remote vehicle interface can abstract the underlying details in the planning stack from the remote requestors and make use of the freespace planner to complete relocation of the vehicle. Other remote requestors may include a facility manager that manages a fleet of vehicles in a facility and wishes to relocate many AVs in freespace in tandem. One additional benefit of the remote vehicle interface is that improvements in the freespace planner or addition of new planners can be done without impacting the relocation workflow from the point of view of the remote requestors.

To execute relocation successfully on the vehicle, the remote vehicle interface may implement a relocation state machine to keep track of different parts or steps of a relocation session. The relocation state machine can have states that correspond to different parts or steps of a relocation session. The remote vehicle interface can receive relocation commands and/or vehicle events and transition the relocation state machine to different states based on the commands and/or events. States can include inactive, awaiting pose, paused, and moving. States can further include engaging and disengaging. The relocation state machine can ensure that (valid) state transitions between states are allowed and/or only performed in response to specific relocation commands and/or vehicle events. In other words, the relocation state machine can enforce a sequence of actions to be performed in the planning stack to ensure that relocation can occur successfully. The relocation state machine can ensure that relocation cannot be engaged if certain events are occurring. The relocation state machine can ensure that relocation may be disengaged if certain events are occurring.

The state of the relocation state machine can be published at every tick. Certain vehicle events may prevent the state of the relocation state machine from transitioning to an engaging state. Subscribers to the state can take action according to the state of the relocation state machine.

A scenario manager may subscribe to the state of the relocation state machine to perform actions in the planning stack corresponding to the different states. Based on the state, the scenario manager can generate appropriate scenarios and engage appropriate planners based on the state. The scenario manager may arbitrate between other scenarios being triggered by other input sources. Based on the state of the relocation state machine, the scenario manager may request the freespace planner to generate an output plan for the target relocation pose. If an output plan can be determined by the freespace planner, the scenario manager can provide the output plan as scenario evaluation feedback from the freespace planner to the remote vehicle interface. The scenario manager may determine from the state of the relocation state machine that the output plan is accepted by the requestor and is allowed by the requestor to be executed. The scenario manager can determine an appropriate motion planner to carry out the output plan and may orchestrate handoff between different motion planners to relocate the autonomous vehicle to ensure the output plan can be executed. The scenario manager may engage with a stay still planner when transitioning between a structured planner and a freespace planner. The stay still planner may keep the AV stationary while the scenario manager transitions between the structured planner and the freespace planner. The scenario manager may control an interface to select the output plan generated by the motion planner that is in control of the AV, such that the selected output plan can be provided to the vehicle control stack.

Overview

It may be desirable for a remote advisor to request AV to relocate to a target relocation pose. In some cases, one possible output plan to move the AV towards the target relocation pose may involve the AV driving forward and in reverse (e.g., performing a multi-point maneuver) in order to reach the target relocation pose. Ability to perform relocation that involves a multi-point maneuver offers flexibility for the AV to maneuver around double-parked vehicles, to avoid obstacles, to aid a reroute when a route becomes unnavigable, etc. To support relocation that involves changing directions of travel (e.g., going between forward and reverse) or performing multi-point maneuvers, the planning stack may be modified to include a motion planner (e.g., a freespace planner) that can generate output plans that involve the AV going forward and in reverse. For example, the freespace planner may generate an output plan that involves reaching a target relocation pose by driving the AV forward following a first segment of an output plan, and then reversing the AV following a second segment of an output plan. Additionally, the vehicle control stack may be implemented with appropriate path followers, check for invalid requests to the vehicle control stack, change gears appropriately, offer ability to perform static steering (turning steering wheel while the AV is stationary), and turn on appropriate vehicle signal lights when executing the output plan. Moreover, the vehicle control stack may publish vehicle controls information as feedback information to the remote requestor so that the remote requestor can be informed of the relocation session and the state of the AV. Vehicle control stack may publish vehicle controls information as feedback information to the freespace planner (and any other suitable motion planner) generating the output plan to assist in planning multi-point maneuvers. The feedback information may be helpful to the freespace planner in the event that the output plan may need to be revised or recalculated based on the feedback information. The feedback information may be helpful to the freespace planner when the freespace planner waits for the AV controls to shift gears in between segments with different directions of motion. The feedback information may be helpful to the freespace planner in determining timing information for the output plan.

An exemplary remote requestor is a remote assistance platform with one or more remote advisors controlling AVs on the road. The remote assistance platform may be operated by one or more remote advisors. In some situations, a remote advisor may request an AV to relocate to a target relocation pose. It is not trivial to execute remote relocation because the advisor is not physically co-located with AV to take over. One technical challenge is to provide a user interface that can convey useful and salient information to the remote advisor and can help the remote advisor initiate relocation and execute relocation in a timely fashion. It can be beneficial for the remote advisor to have contextual awareness of the environment around the AV and awareness of the state of the AV itself, so that remote advisors can have the confidence to execute a complex maneuver. An intuitive graphical user interface can allow a remote advisor to easily provide target relocation poses, can display a feasible output plan, and can ensure the remote advisor has salient information to confirm and execute the output plan. The graphical user interface can include useful components to enable the remote advisor to visualize possible target relocation poses and the computed output plan. The remote assistance platform may validate application requirements of relocation (e.g., ensuring the output plan does not involve reversing the AV into an intersection). The autonomous vehicle may provide vehicle controls information to the remote assistance platform so that the remote advisor can be informed about the state of the AV during a relocation session.

Various embodiments herein and their advantages may apply to a wide range of vehicles (e.g., semi-autonomous vehicles, vehicles with driver-assist functionalities, etc.), and not just autonomous vehicles.

Exemplary Remote Requestors and Their Interactions With the AV Stack

FIG. 1 illustrates exemplary remote requestors, a planning stack 112, and a vehicle control stack 110, according to some aspects of the disclosed technology. A remote requestor may send requests to relocate AV 130. Requestors can be physically remote (or physically located remotely) from AV 130. Requestors may communicate with the AV 130 over a network. To relocate AV 130, a remote requestor may submit a relocation request or relocation command, e.g., over a network, preferably over a secured communication channel, to the planning stack 112. In response to the relocation request or relocation command, planning stack 112 may generate an output plan for vehicle control stack 110 to execute relocation.

Exemplary remote requestors can include remote assistance 132, and facility manager 134. Remote assistance 132 may be part of a remote assistance platform, where remote advisors may be trained to assist AVs such as AV 130 remotely. Remote advisors may use remote assistance 132 to have a remote assistance call session with passenger(s) of AV 130. Remote advisors may use remote assistance 132 to remotely monitor or observe the AV 130. Remote advisors may use remote assistance 132 to speak with a law enforcement officer outside of AV 130. Remote assistance 132 may perform diagnostics on the hardware and/or software of the AV 130. Remote advisors may use remote assistance 132 to remotely control AV 130 to perform actions such as relocating the AV to a desired target pose, shutting down the AV, causing the AV to reach a minimal risk condition, turning on vehicle signal lights of the AV, triggering the AV to enter a degraded state, etc. In some cases, an algorithm in remote assistance 132 may remotely control AV 130 to perform the same or similar actions. The algorithm may generate the desired target poses for AV 130 (e.g., based on information such as sensor data captured by the AV 130, contextual information about the AV, information about the environment of the AV, and information about the AV, information about the passenger, etc.) and generate relocation requests or commands to those desired target poses. The algorithm may operate with minimal to no human intervention or input. Facility manager 134 may transmit relocation requests or commands to relocate AVs in a fleet of AVs in a facility (e.g., garage, outdoor lot, parking lot, open field, etc.). A human fleet manager may input desired target poses for various AVs in a fleet. An algorithm implemented in facility manager 134 may generate desired target poses for various AVs based on tasks scheduled to be performed to the AVs and facility space/resource availability. The algorithm may operate with minimal to no human intervention or input. The algorithm may generate the relocation requests or commands to the desired target poses. Facility manager 134 may relocate many AVs in a fleet in tandem by sending relocation requests or commands to the AVs in the fleet. The relocation requests or commands can instruct the AVs to relocate to different desired target poses in the facility. Both remote assistance 132 and facility manager 134 are examples of remote requestors that may benefit from being able to relocate AV 130, and potentially make use of one or more other motion planners that have different driving goals or constraints to relocate AV 130.

The planning stack 112 can include the remote vehicle interface 170, a scenario manager 150, a plurality of motion planners 152, and an interface 108. The remote vehicle interface 170 serves as the application programming interface that allows different remote requestors to submit relocation requests. Remote requestors can use remote vehicle interface 170 to request relocation of AV 130. The remote vehicle interface 170 can translate the relocation requests or commands and cause the scenario manager 150 to execute the relocation requests. The remote vehicle interface 170 thus abstracts the underlying details in the planning stack 112 from the remote requestors and separates the concerns of between the remote requestors interested in requesting relocation and scenario manager 150 and motion planners 152 that are executing the relocation in the planning stack 112. The remote vehicle interface 170 enables servicing of relocation requests or commands made by different kinds of remote requestors, as long as the remote requestors can use the application programming interface defined by the remote vehicle interface 170. Updates and improvements to the motion planners (e.g., updates to the individual motion planners and addition of new planners) would not impact the remote requestors requesting relocation.

Scenario manager 150 may receive relocation state information from remote vehicle interface 170 and requests from other input sources 160. Other input sources 160 may include a mission manager that receives missions (e.g., "take me to this address", "return to facility and charge", "go to this waypoint to pick-up a package", etc.) from ridehailing/ridesharing platform, a customer of the platform, or fleet management platform. Scenario manager 150 may arbitrate or prioritize different incoming information or requests to determine which scenario to service/evaluate for execution by a downstream motion planner. In some cases, scenario manager 150 may determine that a relocation request or scenario has higher priority against other incoming requests or scenarios, and in response to the determination, services/evaluates the relocation request or scenario.

Scenario manager 150 may operate within a primary stack (e.g., for normal driving, for when the AV 130 is in a normal, non-degraded state) and can manage different motion planners of motion planners 152. Depending on the scenario being evaluated by scenario manager 150 (e.g., scenario may correspond to different tasks to be performed by AV 130 or different driving goals/objectives to be achieved by AV 130), scenario manager 150 may select one of the motion planners in motion planners 152 to take control of AV 130. Exemplary motion planners may include structured planner 102, stay still planner 104, and freespace planner 106. It is envisioned that other planners may be included in motion planners 152. Motion planners can generate output plans for different scenarios, tasks, or goals. Because motion planners may operate differently and may have different constraints/limitations, some motion planners may be preferred for certain scenarios, tasks, or goals. Scenario manager 150 may determine which motion planner is to control AV 130 (in other words, an output plan generated by the appropriate motion planner is the output plan provided to vehicle control stack 110). Scenario manager 150 may determine that a stay still planner is to be used when transitioning between structured planner 102 and freespace planner 106. Scenario manager 150 may determine that freespace planner 106 is to be used when moving AV 130 to a target relocation pose.

Structured planner 102 may be specialized in generating paths for the AV in structured, nominal driving (e.g., tasks or scenarios that involve the AV driving forward and/or backwards). Structured, nominal driving may involve path planning based on semantic map information, such as a detailed, lane-level map, and detected objects of the AV's surroundings. Stay still planner 104 may be specialized in producing output plans that involve the AV staying still or maintaining a very low speed (close to zero). Freespace planner 106 may be specialized in generating paths for the AV in unstructured, freespace driving. Unstructured, freespace driving may involve collision-free and safe path planning based on sensor data and potentially without a detailed, lane-level map of the AV's surroundings. Another exemplary motion planner may be specialized in generating paths for the AV to drive in reverse. Other exemplary motion planners may be specialized in generating paths for completing other tasks such as: parking, maneuvering around inside a building structure, pulling over, driving on a highway, driving on a freeway, driving off-road, driving in inclement weather conditions, etc.

In some cases, for relocating AV 130, it may be beneficial to utilize freespace planner 106 to generate an output plan for AV 130 (as opposed to structured planner 102). The freespace planner 106 may use a graph-based path planning or path finding algorithm (e.g., Dijkstra, A*, RIPA, Sample, etc.) to generate collision-free kinematically feasible paths. The algorithm used in freespace planner 106 may be different from the algorithm used in structured planner 102. Path planning may find an optimal feasible path, based on one or more metrics. Path planning may find the shortest feasible path. In some cases, path planning may find the most comfortable feasible path. In some cases, path planning may find the safest feasible path. Freespace planner 106 may generate paths without constraints such as remaining within lane lines, not driving on a curb, following traffic signals, abiding by structured rules in structured planner 102, etc. Freespace planner 106 may be controllable (e.g., through information provided by scenario manager 150) to operate in different expert modes where some constraints may be enabled or disabled when freespace planner 106 is searching for feasible paths. Expert modes may include modes where advisors having different levels of expertise or experience with relocation may be authorized to ignore certain constraints or information. For instance, freespace planner 106 may be instructed to ignore information from camera feeds. Freespace planner 106 may be instructed to ignore information from range sensor feeds. Freespace planner 106 may be instructed to ignore inferences from the perception stack. Freespace planner 106 may be instructed to ignore inferences from the prediction stack.

In some embodiments, freespace planner 106 can generate output plans having paths and vehicle control requests that moves an AV forward and in reverse. Such output plans may be beneficial when an AV is to maneuver out of tighter spaces (e.g., road is narrow, road is obstructed by other vehicles or barriers), or be able to turn around on the road (e.g., perform a Y-turn or K-turn). The output plan may have multiple segments, e.g., corresponding to different parts of a multi-point maneuver. The multiple segments are arranged in a sequence of segments that are connected or linked to each other one after another to execute a full path or trajectory of the output plan. A segment can be a portion of an output plan where the AV is traveling either forward or in reverse, while optionally turning the steering wheel (e.g., to follow a non-zero and variable curvature). A segment can be unidirectional. A segment may mean that an AV travels a certain distance. One example of such a segment is where an AV travels forward from a first pose to a second pose. One example of such a segment is where an AV travels in reverse from a third pose to a fourth pose. Between two segments of an output plan involving different directions of motion can be a transition between segments. A transition may link two segments. A transition can mean that the AV is stationary as the AV transitions between two segments. A transition can be the beginning of an output plan where the AV is stationary and shifts gears to proceed to execute a following segment. This transition may be referred to as a starting transition. In other words, an output plan may start with a (starting) transition, followed by a segment. A transition can be the end of an output plan, where the transition follows a segment. This transition may be referred to as an ending transition. The AV may have completed a (final) segment driving in reverse and is presently stationary. In the ending transition, the AV may shift gears to the drive gear so that the AV can be ready to drive forward again. An output plan may include a segment and end with a (ending) transition that follows the segment. One example of a transition is where the AV is stopped to change gears. Another example of a transition between two segments is where the AV is stopped to move the steering wheel. Another example of a transition is where the AV is stopped to change gears and move the steering wheel.

In some embodiments, when scenario manager 150 is evaluating and/or servicing relocation commands from remote vehicle interface 170, scenario manager 150 may coordinate communicating with different motion planners in motion planners 152 to compute output plans and coordinate handoff between different motion planners to successfully perform relocation of the AV 130.

In some cases, the planning stack may include a watchdog 118, a fallback manager 120, and a secondary stack 122. Watchdog 118 may monitor for and publish state of fault conditions or faults occurring on AV 130. Fallback manager 120 may trigger AV 130, based on the fault conditions and/or faults, to enter a degraded state (or one of many degraded states), and cause a secondary stack 122 (or other stacks, if appropriate) to take control of AV 130. Secondary stack 122 and other stacks may provide redundancy and failsafe mechanisms for AV 130 to operate safely even if the AV 130 may encounter one or more fault conditions or faults. Secondary stack 122 and other stacks may perform driving maneuvers to bring AV 130 to a minimal risk condition (e.g., pulling over and coming to a stop gracefully and safely, slowly decelerating to come to a stop, etc.). Secondary stack 122 or other stacks may use different sensors to generate output plans. Other stacks may be included for different degraded states of AV 130. Secondary stack 122 or other stacks may be orthogonal to the primary stack. For example, secondary stack 122 may have orthogonal dependencies than the primary stack. Secondary stack 122 may depend on one type of sensor data only, whereas the primary stack may depend on other types or additional types of sensor data. Secondary stack 122 may include different algorithms or methodologies for producing a plan for the AV 130. Orthogonality can mean that the dependencies do not overlap with each other or are different from each other, so that faults occurring in a first stack may be less likely to occur in a second stack whose dependencies are orthogonal to the dependencies of the first stack. Secondary stack 122 may be implemented on different hardware than the primary stack. In some cases, watchdog 118 and/or fallback manager 120 may be external to planning stack 112.

Interface 108 may receive selection signals from scenario manager 150 and/or fallback manager 120 that enables interface 108 to select the appropriate output plan from various output plans being generated by the upstream motion planners and/or secondary stack 122, generally referred herein as output plan generators. In some cases, interface 108 may validate the output plan to ensure that the output plan can be executed by vehicle control stack 110. The selected output plan is then provided to vehicle control stack 110 to control AV 130 and carry out the selected output plan. All output plan generators (e.g., motion planners 152 and secondary stack 122) in the planning stack 112 can use interface 108 to interface with the vehicle control stack 110. For instance, motion planners 152 may use interface 108 to specify (reference) plans and may submit other vehicle actuator (vehicle hardware control) requests such as gear shifting or blinkers/hazards light changes. The interface 108 can ensure consistency in time and across different output plan generators. Interface 108 can optionally arbitrate conflicts or inconsistencies in time and across different output plan generators. Interface 108 can manage any number of upstream output plan generators. Additionally, with interface 108 managing the plans being produced by output plan generators, the vehicle control stack 110 may receive and consume a single data stream, regardless of which output plan generator is in control or is active.

The vehicle control stack 110, e.g., software vehicle controls, can receive output plans generated by the planning stack 112 upstream of the vehicle control stack 110. Vehicle control stack 110 can generate (vehicle actuator) commands to control vehicle actuators of AV 130 based on the received output plans. Examples of vehicle actuators of AV 130 may include: vehicle gear control, vehicle blinker light control, vehicle hazard light control, vehicle steering control, vehicle brake control (which can include electronic parking brake control and/or wheel brake control), vehicle motor controls, and vehicle horn control. Vehicle control stack 110 can send (actuator) commands to vehicle actuators to cause a gear of AV 130 to change, cause the AV 130 to brake, cause the AV 130 to turn steering by a certain amount, cause the AV 130 to accelerate by a certain amount, cause the horn of the AV 130 to honk, etc.

In some embodiments, vehicle control stack 110 may include one or more path followers (PFs) and low-level controls (LLC) 190. A path follower may generate a local path for the vehicle to take. The local path may be optimized based on tracking error of the local path relative to a reference trajectory in the output plan received from interface 108. The local path may include a corrective action to get the AV 130 to converge on and stick to the reference trajectory of the received plan when the AV deviates from the reference trajectory.

In some cases, scenario manager 150 may switch between different kinds of (nominal, normal driving) use cases, such as going forward and going in reverse. Also, some planners (e.g., freespace planner 106) may output plans that involve the AV 130 going forward and going in reverse in different segments of the plan. Vehicle control stack 110 may be provided with different path followers designed, optimized, and tuned for different use cases. As illustrated, the vehicle control stack 110 may include a plurality of path followers, such as forward path follower 182, and reverse path follower 184. Depending on the use case, certain vehicle control commands or maneuvers can be performed for some use cases, but not for other use cases. The constraint(s) for finding an optimal local path may also differ depending on the use case. Providing different types of path followers in vehicle control stack 110 may enable more complicated driving maneuvers to be performed in a specific output plan, such as multi-point maneuvers, multi-point turns, or parallel parking, which may switch between different use cases. In some cases, one path follower may be optimized for structured driving, such as driving forward at speed, and another path follower may be optimized for driving in reverse. The path follower optimized for driving in reverse (e.g., reverse path follower 184) may be able to command the steering wheel to turn in place, while the path follower optimized for driving forward at speed cannot. Reverse path follower 184 may be able to perform angled reverse to follow non-zero and/or variable curvature of a path.

In some embodiments, vehicle control stack 110 may include a forward path follower 182 to generate a local forward path, and a reverse path follower 184 to generate a local reverse path. An arbiter 180 (e.g., a direction of motion arbiter) can be included in vehicle control stack 110 to check the output plan from interface 108 to determine (expected) direction of motion of the vehicle, e.g., determine if forward motion is involved or reverse motion is involved. Arbiter 180 can select or activate the appropriate path follower based on the direction of motion of the vehicle. If forward motion is involved, the arbiter 180 may select or activate the forward path follower 182. If reverse motion is involved, the arbiter 180 may select or activate the reverse path follower 184. Low-level controls 190 may be provided in vehicle control stack 110 to generate (actuator) commands based on either the local forward path produced by forward path follower 182 or the local reverse path produced by reverse path follower 184.

A path follower, e.g., forward path follower 182 and reverse path follower 184, may produce a local path that follows the reference trajectory of the received plan as closely as possible, given certain constraint(s). Different path followers may have different sets of constraints. Constraints can include: comfort, speed, feasibility, lateral acceleration, curvature, curvature rate, lateral jerk, etc. Low-level controls 190 may generate commands, such as actuator commands, to the vehicle actuators based on the local path produced by a path follower. For instance, low-level controls 190 may translate the local path into, e.g., engine torque, braking torque, steering wheel angle, transmission request, and electronic parking brake request for the vehicle actuators. Low-level controls 190 may determine desired gear and produce gear control commands to change the gear of the vehicle. Low-level controls 190 may determine whether left/right blinker lights or hazard lights are to be turned on and produce commands to turn on the left/right blinker lights or hazard lights.

Exemplary Remote Vehicle Interface and Exemplary Scenario Manager

Figure 2:
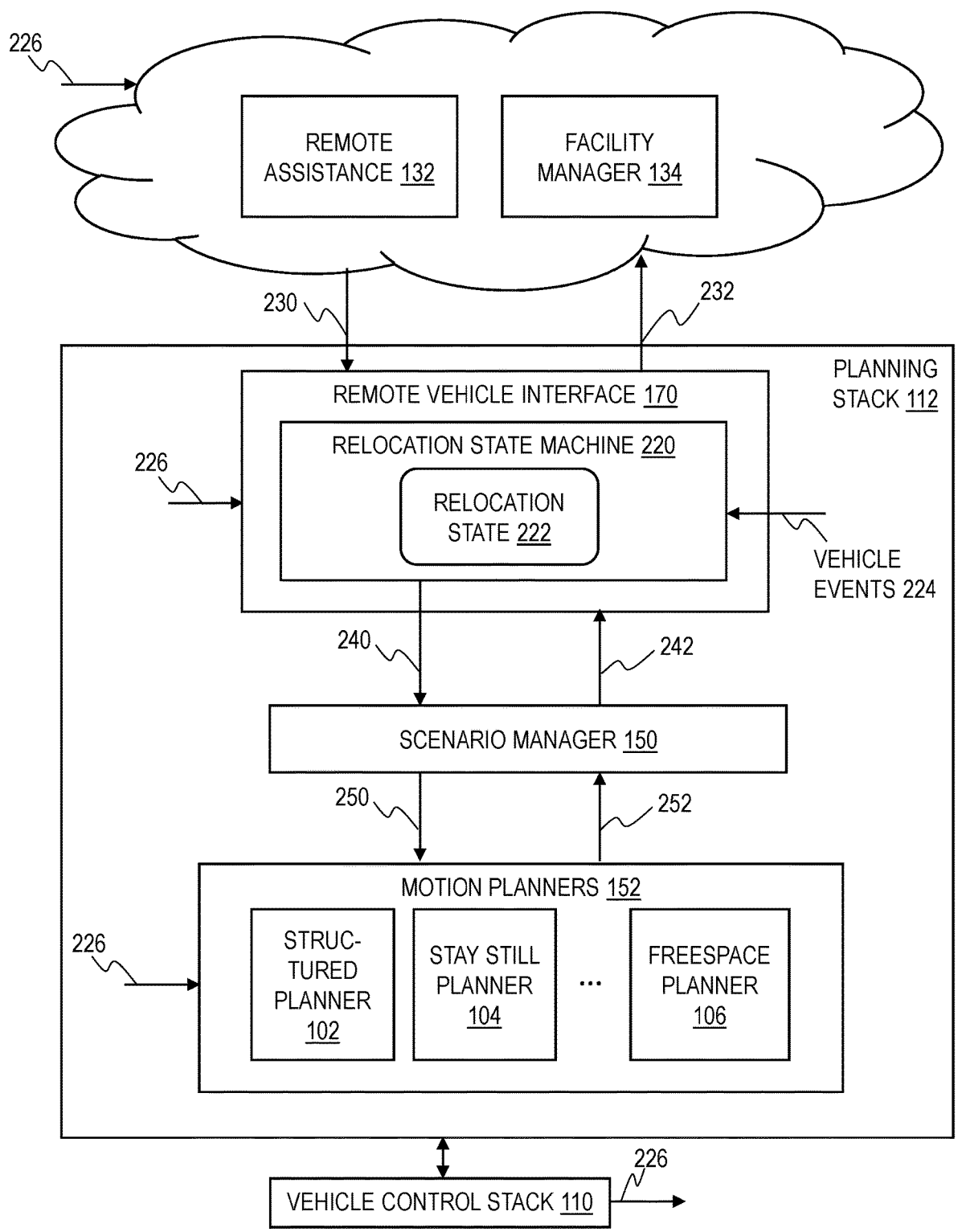
FIG. 2 illustrates exemplary remote requestors, a remote vehicle interface, a scenario manager, motion planners, vehicle control stack, and information flowing between them, according to some aspects of the disclosed technology.

FIG. 2 illustrates exemplary remote requestors, a remote vehicle interface 170, a scenario manager 150, motion planners 152, vehicle control stack 110, and information flowing between them, according to some aspects of the disclosed technology. Herein, arrows are meant to illustrate direction of information flow, and do not necessarily imply that there is a discrete communication link or communication path between entities in the figures. Information may flow from one entity to another through transfer of data from a sender entity to a receiver entity, e.g., in the form of a message from the sender entity to the receiver entity. Information may flow from one entity to another entity through data topics, where a publisher entity may send the information by publishing the information to data topics, and a subscriber entity may receive the information by subscribing to the data topics. The use of data topics means that one or more publisher entities can publish information, and one or more subscribers can subscribe to the information.

As described with FIG. 1, motion planners 152 may include a structured planner 102, stay still planner 104, and freespace planner 106. In particular, the freespace planner 106 may have different, or fewer constraints than the structured planner 102. Without strict adherence to lane boundaries, the freespace planner 106 may assist an AV by finding a feasible path for the AV to navigate through unusual traffic situations. Using the freespace planner 106 as a backup motion planner may be particularly useful when the structured planner 102 is unable to produce an output plan. Some unusual traffic situations (e.g., situations involving temporary traffic restrictions such as traffic cones or barricades) may necessitate driving in a lane that is not allowed by structured planner 102, or driving on a curb that is not allowed by structured planner 102. With more relaxed buffer/distance constraints, the freespace planner 106 may find a feasible path for the AV to drive through narrower gaps than what is allowed by the structured planner 102. With less limitations, a remote advisor may choose or try target relocation poses for an AV to get around phantom objects and attempt to generate an alternative path that would not have been feasible with the structured planner 102 and prevent the structured planner 102 from reverting back to the path that the structured planner 102 refuses to execute due to the phantom object. Freespace planner 106 can serve as a backup or alternative motion planner to help get an AV unstuck in certain special, time-limited situations. Freespace planner 106 is not intended to be used for normal driving. In some embodiments, the structured planner 102 can produce plans to avoid collisions with obstacles and accounts for semantic map information, and the freespace planner 106 can produce plans to avoid collisions with obstacles and does not account for semantic map information. Freespace planner 106 may produce an output plan that has multiple segments. Freespace planner 106 may produce an output plan involving the AV moving forward (in one segment) and in reverse (in a different segment). The output plan may include a transition between two segments going in different directions. The output plan may include additional transitions that link two segments of the output plan. An output plan may include a reference trajectory for the AV to follow. A segment of an output plan may include a portion of the reference trajectory. The output plan may include vehicle actuator (vehicle hardware control) requests (e.g., change gears, turn on hazard lights, etc.). A segment of an output plan may include a subset of the vehicle actuator requests that correspond to the segment.

Remote vehicle interface 170 may receive relocation commands as part of arrow 230 from one of the remote requestors, e.g., remote assistance 132 and facility manager 134. The relocation commands may be defined by an application programming interface of the remote vehicle interface 170. Exemplary relocation commands, in accordance with the application programming interface of remote vehicle interface 170, may include:

A start relocation request: a request that may initiate or start a relocation session and indicates that a requestor wishes to relocate the AV. The AV may enter a relocation mode. The request may include metadata identifying the relocation session.

A generate relocation solution request: a request that may request an AV (e.g., freespace planner 106) to generate/compute an output plan based on and towards a target relocation pose. The AV may not execute the path, but only generate/compute the path. The AV may return or publish the path so that the path can be provided to a remote requestor for visualization. The request may include metadata identifying the relocation session and target relocation pose information. Optionally, the request may include a unique target relocation pose identifier identifying the target relocation pose. The target relocation pose identifier can be echoed by the AV to allow the remote requestor to verify that the AV is evaluating the remote requestor's most recent request. The target relocation pose identifier can help disambiguate race conditions if the remote requestor sends multiple commands in rapid succession.

An execute relocation solution request: a request that may request an AV (e.g., freespace planner 106) to implement the generated/computed path to move the AV towards the target relocation pose. The request may include metadata identifying the relocation session and an execution type value.

A reset relocation solution request: a request that may ask the AV to clear its current target relocation pose as previously specified by the generate relocation solution request. The request may include metadata identifying the relocation session.

A stop relocation solution request: a request that may ask the AV to stop or end the relocation session. The AV may exit the relocation mode. The request may include metadata identifying the relocation session.

Figure 3:
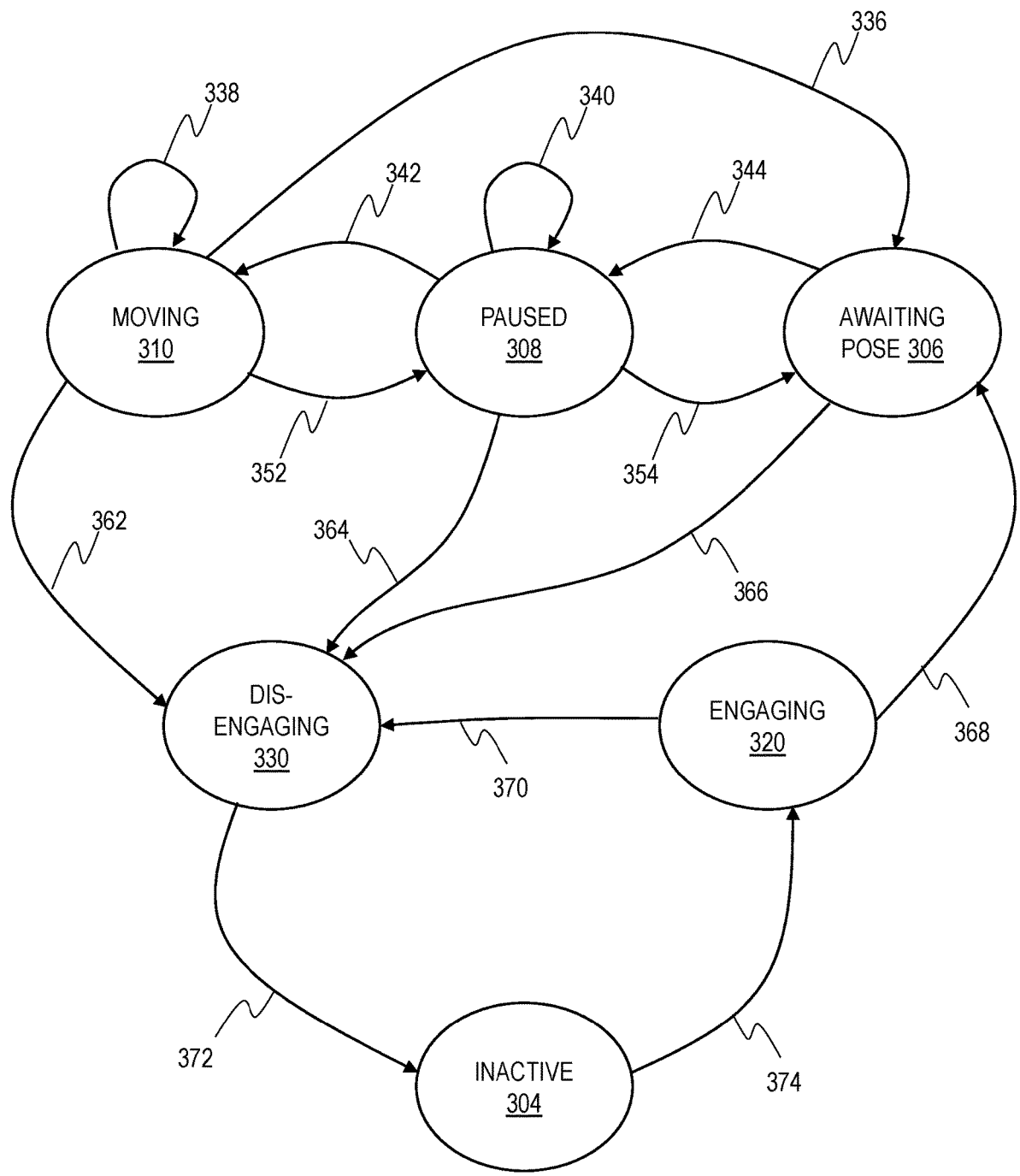
FIG. 3 illustrates an exemplary state machine transition diagram, according to some aspects of the disclosed technology.

Remote vehicle interface 170 may include a relocation state machine 220. Relocation state machine 220 may be a finite state machine. Relocation state machine 220 may have different states. States can include one or more of: inactive or INACTIVE, awaiting pose or AWAITING_POSE, paused or PAUSED, and moving or MOVING. States can further include engaging or ENGAGING, and disengaging or DISENGAGING. An exemplary implementation of states and state transitions of relocation state machine 220 is illustrated in FIG. 3. Remote vehicle interface 170 may update the relocation state machine (e.g., change states or transition states) based on received relocation commands. Remote vehicle interface 170 may update the relocation state machine (e.g., change states or transition states) based on vehicle events 224 (e.g., events which are happening to or in the AV). Remote vehicle interface 170 may update the relocation state machine (e.g., change states or transition states) based on timeouts.

Remote vehicle interface 170 may publish a relocation state 222 to subscribers to the relocation state 222. In some examples, remote vehicle interface 170 may publish relocation state 222 as part of arrow 240 to the scenario manager 150. In some examples, remote vehicle interface 170 may publish relocation state 222 as part of arrow 232 to a requestor. The remote vehicle interface 170 may publish a current state of the relocation state machine. The remote vehicle interface 170 may publish one or more state transition failure reasons of the relocation state machine 220. The remote vehicle interface 170 may publish a target relocation pose of the vehicle. The remote vehicle interface 170 may publish an identifier of the relocation session. The remote vehicle interface 170 may publish an indication that a relocation state 222 of the relocation state machine 220 changed for a current tick.

Scenario manager 150 may generate a relocation scenario based on the relocation state 222. Scenario manager 150 may appropriately transition between different motion planners in motion planners 152 and determine which motion planner is to be in control of the AV. In some cases, scenario manager 150 may communicate with motion planners (as illustrated by arrow 250 and arrow 252) through an application programming interface. The application programming interface may include messaging between the scenario manager 150 and the motion planners 152. The application programming interface may include data topics for publishing and subscribing to information. Scenario manager 150 may publish to data topics that correspond to different motion planners, and the motion planners may subscribe to respective data topics. Motion planners 152 may publish information to scenario manager 150 via respective evaluation data topics to which the scenario manager 150 is subscribed. Scenario manager 150 may publish information to a structured planner data topic to which structured planner 102 is subscribed. Scenario manager 150 may publish information to a stay still planner data topic to which stay still planner 104 is subscribed. Scenario manager 150 may publish information to a freespace planner data topic to which freespace planner 106 is subscribed. If scenario manager 150 determines that a particular motion planner is to control the AV, scenario manager 150 may publish a scenario to the target motion planner (e.g., in arrow 250) to request whether the scenario can be executed. The target motion planner can reply with a scenario evaluation message to provide feedback information to scenario manager 150 (e.g., in arrow 252) indicating whether the proposed scenario would be successful or not. If the scenario manager 150 confirms that the target motion planner can execute the proposed scenario based on the scenario evaluation message, the scenario manager 150 can determine that the target motion planner is in control or is the active planner (e.g., ensures that the output plan generated by the target motion planner is provided to the vehicle control stack).

In some cases, scenario manager 150 may receive relocation requests and other incoming requests and generate different scenarios in response to the requests. Scenario manager 150 may evaluate priorities of the different scenarios (e.g., a stay still scenario, a relocation scenario, etc.). Scenario manager 150 can determine that the relocation scenario has the highest priority over other scenarios being evaluated in scenario manager. Upon determining that the relocation scenario has the highest priority, scenario manager 150 may evaluate the relocation scenario, and publish the relocation scenario to the appropriate motion planner, e.g., freespace planner 106.

When performing relocation, scenario manager 150 may publish the relocation scenario in arrow 250 to the freespace planner 106. Scenario manager 150 may receive a target relocation pose from a remote requestor in a relocation command sent via arrow 230. The scenario manager 150 may generate the relocation scenario based on the received target relocation pose.

Scenario manager 150 may receive scenario evaluation feedback from the motion planners 152. In response to receiving a scenario, a target motion planner can evaluate the scenario and send scenario evaluation feedback to scenario manager 150. For example, in response to receiving a relocation scenario, the freespace planner 106 can evaluate the relocation scenario and provide scenario evaluation feedback from the freespace planner 106 to the scenario manager 150. The freespace planner 106 may, if an output plan is feasible (e.g., the relocation scenario is considered successful), compute or generate an output plan that can take the AV to the target relocation pose. The freespace planner 106 may provide, in arrow 252, scenario evaluation feedback that includes path information in the output plan from the freespace planner 106.

In response to receiving relocation commands (e.g., a generate relocation solution request), remote vehicle interface 170 may (via scenario manager 150) cause the freespace planner 106 to produce an output plan to reach a target relocation pose specified by the remote requestor. The output plan may involve the vehicle moving forward and/or in reverse in different segments of the output plan. The computed output plan may be provided to the remote requestor, e.g., as a response to the generate relocation solution request.

Freespace planner 106 can provide information in the scenario evaluation feedback in arrow 252 to offer feedback to the requestor. The scenario evaluation feedback or a derivation thereof may flow, via scenario manager 150 and remote vehicle interface 170, to requestor as feedback for the relocation session. In some cases, the scenario evaluation feedback includes the path information of the output plan so that the requestor can visualize the path (e.g., requestor can generate a visualization of the path in a graphical user interface) computed by the freespace planner. The freespace planner 106 may, if an output plan is not feasible (e.g., the relocation scenario is not considered successful), provide in arrow 252 an indication that no output plan can be determined for the given target relocation pose as the scenario evaluation feedback. The requestor may, in response to the scenario evaluation feedback, attempt a different target relocation pose. In some cases, the scenario evaluation feedback in arrow 252 may include an indication that a position of a given target relocation pose is achieved in the output plan but not an orientation of the given target relocation pose (not achievable within a certain threshold). The requestor may, in response to the scenario evaluation feedback, attempt a different target relocation pose (adjusting position and/or orientation). In some cases, the scenario evaluation feedback in arrow 252 may include an indication that an imminent collision is predicted. In some cases, the scenario evaluation feedback in arrow 252 may include an indication that an imminent collision is predicted and path information for a new collision-free output plan. The requestor may, in response to the scenario evaluation feedback, authorize the new collision-free output plan. In some cases, the scenario evaluation feedback in arrow 252 may include alternative or multiple (feasible) output plans executable by the vehicle control stack. The requestor may, in response to the scenario evaluation feedback, select and authorize a preferred output plan among the output plans to be executed. In some cases, the scenario evaluation feedback in arrow 252 may include multiple output plans executable by the vehicle control stack that correspond to requestors with different levels of expert level or requestors operating with different expert modes. The requestor may, in response to the scenario evaluation feedback, confirm that the requestor is authorized to execute a preferred output plan, and request/authorize the preferred output plan among the output plans to be executed.

The scenario manager 150 may provide scenario evaluation feedback or a derivation thereof to remote vehicle interface 170 via arrow 242. The scenario evaluation feedback or derivation thereof may include a computed output plan. In some cases, remote vehicle interface 170 may provide path information in the output plan from the freespace planner 106 to a requestor so that the requestor can visualize the path.

To assist a remote advisor, e.g., during execution of the output plan, the vehicle control stack 110 may generate vehicle controls information (e.g., state of the vehicle actuators, state of the vehicle control stack 110, etc.). Some vehicle controls information may inform a remote advisor of the present state of the AV as the AV executes relocation. Some vehicle controls information may inform a remote advisor how long the maneuvers may take, so that the remote advisor may take the expected duration of the maneuvers into account when planning and executing relocation. Vehicle controls information may be used for validation on the remote assistance platform, to ensure that remote relocation application requirements are met. Vehicle controls information may be displayed via a graphical user interface to remote advisors to assist with relocation.

The vehicle control stack 110 may publish the vehicle controls information 226. For example, the vehicle control stack 110 may provide the vehicle controls information 226 to remote vehicle interface 170, which may provide the vehicle controls information 226 as part of arrow 232 to a remote requestor. In some cases, the vehicle controls information 226 may impact or cause state transitions of relocation state machine 220. In some cases, the vehicle control stack 110 may provide or publish the vehicle controls information to a remote requestor (e.g., remote assistance 132, facility manager 134, etc.).

In some cases, the vehicle controls information 226 may be provided as feedback information to one or more motion planners 152 (e.g., a motion planner that is in control of the AV). In some embodiments, the vehicle controls information 226 may be provided to the freespace planner 106 as feedback information. The freespace planner 106 may consume the feedback information or take the feedback information into account (e.g., wait for the AV to shift gears) when generating a next output plan for the vehicle or when making a change or adjustment to the output plan. The freespace planner 106 may consume the feedback information to determine timing information associated with a computed output plan. The timing information may inform the remote advisor of the expected durations of segments and/or transitions in a computed output plan.

Examples of vehicle controls information may include:

A current gear of the vehicle.

A target gear of the vehicle (e.g., next gear of the vehicle).

Gear shifting readiness of the vehicle (which can depend on vehicle speed and whether the previous gear has been completed.).

Estimate of gear shifting duration of the vehicle (which can change depending on whether the vehicle is on an incline or sloped road).

A current speed of the vehicle.

Position control error (how far off is the actual/estimated position of the vehicle to a local path produced by a path follower or how far off is the actual/estimated position of the vehicle from an expected position of the vehicle executing a set of commands).

Current state information corresponding to a vehicle blinker light of the vehicle (e.g., on, flashing, off, not operational, etc.).

Target state information corresponding to a vehicle blinker light of the vehicle (e.g., flashing, off, etc.).

Current state information corresponding to a vehicle hazard light of the vehicle (e.g., on, flashing, off, not operational, etc.).

Target state information corresponding to a vehicle hazard light of the vehicle (e.g., flashing, off, etc.).

The remote vehicle interface 170 may provide vehicle state information in arrow 232 to remote requestors. Examples of vehicle state information in arrow 232 may include one or more of:

Scenario evaluation feedback or a derivation thereof.

Relocation state 222.

Whether the relocation state 222 has been updated in the current tick.

Whether a change in states failed in the relocation state machine 220.

A reason why a change in states failed in the relocation state machine 220.

Whether a timeout condition has occurred.

A state of a relocation session.

Sensor data feeds of the AV to allow requestors to perceive and view the sensor data (camera data).

Map information of the environment of the AV and tracked objects or detected obstacles placed on the map.

Perception information of the environment of the AV.

Prediction information of the environment of the AV.

Fault conditions or faults that the AV has.

Vehicle events 224.

Vehicle controls information 226.

Current pose of the AV.

Current gear of the AV.

Current speed of the AV.

In some cases, during a relocation session, freespace planner 106 can subscribe to a freespace planner data topic to get the latest relocation scenario from (or published by) scenario manager 150. Upon receiving the latest relocation scenario, the freespace planner 106 can compute and propose an output plan for the relocation scenario. If an output plan is accepted by the requestor, and starts to execute, then the accepted output plan can be locked-in. Subsequently computed output plans may deviate at most a certain small distance (e.g., 50 cm) from the locked-in accepted output plan to prevent any dramatic change in the movement of the AV. During the execution of an output plan, the freespace planner 106 may check whether a collision is predicted. If a collision is predicted along the output plan, the freespace planner 106 can change the output plan to stop the AV immediately. The freespace planner 106 can resume executing the output plan if the predicted collision is cleared, or the freespace planner 106 can propose a new collision-free output plan. The freespace planner 106 can propose the new collision-free output plan if the requestor stops authorizing the current output plan.

In the event that the relocation state machine fails to transition states, fails to execute a relocation command, or encounters some other failure, the relocation state machine may publish information about the failure. The information about the failure may be published to the requestor for context and understanding. The requestor may display the failure to an advisor via a graphical user interface. Examples of information about the failure may include:

The vehicle event that prevented a state transition.

An invalid state transition was requested or attempted.

The AV is within the vicinity of an intersection or in an intersection.

The target relocation heading is invalid (greater than a certain number of degrees deviation from the current heading of the AV).

The target position is invalid (too far away or greater than a certain distance threshold from the current position of AV).

Motion planner was unable to find a feasible output plan.

Output plan generated by a motion planner may cause the AV to enter an intersection.

Scenario manager was unable to give control to another motion planner.

Scenario manager was unable to give control to a freespace planner.

Scenario manager was unable to give control to a structured planner.

Scenario manager was unable to give control to a stay still planner.

In some embodiments, a stay still planner 104 is included in motion planners 152. The scenario manager 150 may put the stay still planner 104 in control of the AV when transitioning in between structured planner 102 and freespace planner 106. The scenario manager 150 may generate a stay still scenario based on the relocation state 222 (or upon determining that a transition between structured planner 102 and freespace planner 106 is in order). The scenario manager 150 may publish the stay still scenario to the stay still planner 104, e.g., before transitioning to structured planner 102 or freespace planner 106. A benefit of having the stay still planner 104 is to keep the AV stationary while transitions between different motion planners are occurring.

A vehicle control stack 110 may receive an output plan from the freespace planner (or a motion planner that is in control), and output commands to the vehicle actuators to carry out the received output plan. Transitioning control between motion planners, in response to state transitions of the relocation state machine, may be performed by scenario manager 150 sending a selection signal to an interface (e.g., interface 108 of FIG. 1) in planning stack 112. Scenario manager may in response to determining that the freespace planner is to control the vehicle, controlling an interface to selectively provide an output plan of the freespace planner among outputs of the plurality of motion planners to vehicle control stack 110. Scenario manager may in response to determining that the stay still planner is to control the vehicle, controlling an interface to selectively provide an output plan of the stay still planner among outputs of the plurality of motion planners to vehicle control stack 110. Scenario manager may in response to determining that the structured planner is to control the vehicle, controlling an interface to selectively provide an output plan of the structured planner among outputs of the plurality of motion planners to vehicle control stack 110.

Exemplary Relocation State Machine

FIG. 3 illustrates an exemplary state machine transition diagram for relocation state machine 220 illustrated in FIG. 2, according to some aspects of the disclosed technology. In the illustration, the relocation state machine 220 may be a finite state machine having a plurality of states. Exemplary states include one or more of: MOVING 310, PAUSED 308, AWAITING POSE 306, DISENGAGING 330, ENGAGING 320, and INACTIVE 304. Exemplary valid state transitions are shown.

States of the relocation state machine 220 correspond to different stages or steps relating to a remote relocation session. It is envisioned by the disclosure that the relocation state machine may include two or more of the states shown, and different states can be used to encode the stages/steps. INACTIVE 304 can mean that the AV is not in an active remote relocation session, and that the AV awaits for an incoming start relocation request. INACTIVE 304 can mean that the a remote relocation session is not active. AWAITING POSE 306 can mean that the AV has begun an active remote relocation session, and that the AV awaits for a pose to be specified by a remote advisor. AWAITING POSE 306 can mean that a valid relocation pose has not yet been received. Relocation state machine 220 may transition to AWAITING POSE 306 when a target relocation pose is reached. PAUSED 308 can mean that the AV is in an active remote relocation session and has received a pose, and that the AV awaits for a solution to be generated for the pose. PAUSED 308 can mean that a solution is being determined. PAUSED 308 can mean that AV is not allowed or authorized to move (yet). MOVING 310 can mean that the AV is in an active remote relocation session and has received a solution, and that the AV is executing the solution. MOVING 310 may mean that AV is allowed or authorized to move. Relocation state machine 220 may transition out of MOVING 310 state (only) after the AV decelerates to ~0 m/s. ENGAGING 320 can mean that the AV has just received an incoming start relocation request, and that the AV is transitioning to start or enter an active remote relocation session. ENGAGING 320 can mean that the active remote relocation session is starting. DISENGAGING 330 can mean that the AV has just received a stop relocation request, and that the AV is transitioning to end or exit an active remote relocation session. DISENGAGING 330 can mean that the active remote relocation session is ending, and the AV is attempting hand back to normal operation (e.g., handing back control to structured planner).

The relocation state machine may transition states in response to receiving certain relocation commands. Exemplary valid state transitions in response to certain relocation commands are shown below:

| State | Valid Relocation Command for State Transition | New State | Corresponding to State Transition Arrow in FIG. 3 |
| --- | --- | --- | --- |
| INACTIVE 304 | Start Relocation Request | ENGAGING 320 | 374 |
| AWAITING POSE 306 | Stop Relocation Request | DISENGAGING 330 | 366 |
|  | Generate Relocation Solution Request | PAUSED 308 | 344 |
| PAUSED 308 | Stop Relocation Request | DISENGAGING 330 | 364 |
|  | Generate Relocation Solution Request | PAUSED 308 | 340 |
|  | Reset Relocation Solution Request | AWAITING POSE 306 | 354 |
|  | Execute Relocation Solution Request | MOVING 310 | 342 |
| MOVING 310 | Execute Relocation Solution Request | MOVING 310 | 338 |
|  | Reset Relocation Solution Request | AWAITING POSE 306 | 336 |
|  | Stop Relocation Request | DISENGAGING 330 | 362 |
|  | Generate Relocation Solution Request | PAUSED 308 | 352 |
| ENGAGING 320 | NONE | Not applicable | Not applicable |
| DISENGAGING 330 | NONE | Not applicable | Not applicable |

The relocation state machine may transition states in response to receiving certain vehicle events (e.g., vehicle events 224 of FIG. 2, events which are happening to or in the AV, states of scenario manager 150, which motion planner is in control, state of the vehicle, etc.). One type of such vehicle event is a relocation ending event. A relocation ending event may cause the relocation workflow to terminate (e.g., events which are outside of the requestor's control) and cause the AV to disengage from the relocation workflow. Examples of relocation ending events may include the AV no longer operating in an autonomous mode (e.g., a driver has taken control of the AV), the AV encountering a fault or a fault condition, the AV entering a degraded state, etc. Relocation ending event may cause relocation state machine to transition from PAUSED 308 to transition to DISENGAGING 330 as illustrated by state transition arrow 364. Relocation ending event may cause relocation state machine to transition from MOVING 310 to transition to DISENGAGING 330 as illustrated by state transition arrow 362. Relocation ending event may cause relocation state machine to transition from AWAITING POSE 306 to transition to DISENGAGING 330 as illustrated by state transition arrow 366.

Success or failure to allow the relocation planner to control the AV (e.g., freespace planner, stay still planner) may also cause state transitions of the relocation state machine. The relocation state machine may transition from ENGAGING 320 to AWAITING POSE 306, as illustrated by arrow 368, in response to the scenario manager indicating that the relocation planner is in control. The relocation state machine may transition from DISENGAGING 330 to INACTIVE 304, as illustrated by arrow 372, in response to the scenario manager indicating that the relocation planner is not in control.

The relocation state machine may transition between INACTIVE 304 to ENGAGING 320 in response to receiving a start relocation request. Referring back to FIG. 2, the scenario manager 150 may send a stay still scenario to stay still planner 104 and transition to have the stay still planner 104 to be in control of the AV if the stay still scenario is deemed feasible by the stay still planner 104. In some embodiments, the scenario manager 150 may determine that a stay still planner 104 is to control the vehicle when the relocation state is an ENGAGING state (e.g., ENGAGING 320 in FIG. 3). The scenario manager may publish a stay still scenario to the stay still planner 104. Stay still planner 104 may execute the stay still scenario. Afterwards, the scenario manager 150 may send a relocation scenario to freespace planner 106 and transition to have the freespace planner 106 be in control of the AV if the relocation scenario is deemed feasible by the freespace planner 106.

The relocation state machine may transition between MOVING 310 to DISENGAGING 330 in response to receiving a stop relocation request. Referring back to FIG. 2, the scenario manager 150 may send a stay still scenario to stay still planner 104 and transition to have the stay still planner 104 to be in control of the AV if the stay still scenario is deemed feasible by the stay still planner 104. In some embodiments, the scenario manager 150 may determine that a stay still planner 104 is to control the vehicle when the relocation state is a DISENGAGING state (e.g., DISENGAGING 330 in FIG. 3). The scenario manager may publish a stay still scenario to the stay still planner 104. The stay still planner 104 may execute the stay still scenario. Afterwards, the scenario manager 150 may transition to have the structured planner 102 be in control of the AV.

The relocation state machine may transition states based on timeouts. For instance, if the relocation state machine remains in ENGAGING 320 over a certain period of time (e.g., 3 seconds or another suitable threshold), the relocation state machine may transition to DISENGAGING 330, as illustrated by state transition arrow 370.

The relocation state machine may prevent a state transition to ENGAGING 320 (from INACTIVE 304) if certain vehicle events are occurring. Examples of such vehicle events may include:
One or more doors of the AV are open.
The AV enters a degraded state or is in a degraded state.
The vehicle is not stationary.
The vehicle is in a minimal risk condition. Minimal risk condition can encompass a condition where an AV encounters a failure and subsequently achieves a safe state (e.g., a complete stop). Relocation may not be desirable.
The AV is actively performing a safety or fallback maneuver (e.g., pulling over gracefully, getting out of traffic).
The AV is in a degraded state.
The AV detects high network latency with back-office systems.
The AV is in an invalid gear (e.g., not in drive).

Exemplary Remote Assistance Implementation

Figure 4:
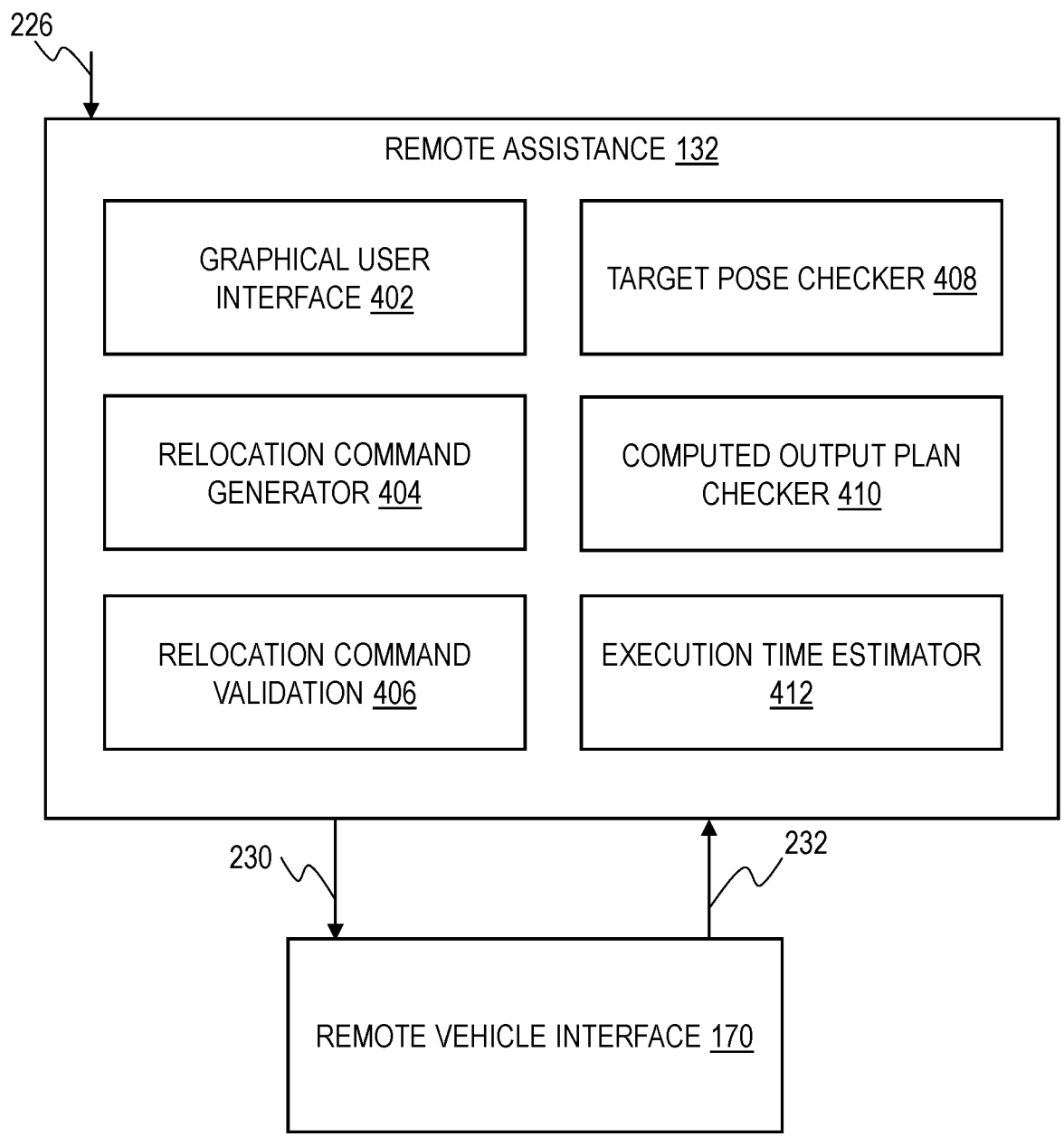
FIG. 4 illustrates remote assistance as a remote requestor and a remote vehicle interface, according to some aspects of the disclosed technology.

FIG. 4 illustrates remote assistance 132 as an exemplary remote requestor and remote vehicle interface 170, according to some aspects of the disclosed technology.

Remote assistance 132 may include a graphical user interface 402 with which remote advisors may interact. An exemplary depiction of the graphical user interface 402 is shown in FIGS. 5, 7A-C and 8A-E. An exemplary workflow involving the graphical user interface 402 and an AV to be relocated is illustrated with FIG. 6. Graphical user interface 402 may display information to a remote advisor. Graphical user interface 402 may receive user input from the remote advisor for a relocation session (e.g., to start a relocation session, to command relocation of an AV to a target relocation pose, to authorize execution of a computed output plan, to end a relocation session, etc.). Advisor may provide user input to remote assistance 132 via graphical user interface 402 using one or more user input devices.

Graphical user interface 402 may display information that may assist the advisor. The information may include one or more of: sensor data streams (e.g., camera feeds), map information with detected obstacles, path information of output plan generated by a motion planner, vehicle state information, vehicle controls information, relocation state information, relocation feedback information, scenario evaluation feedback information, contextual information about the AV, information from the AV stack, tracking information from the AV, perception information from the AV, prediction information from the AV, planning information from the AV, etc. Graphical user interface 402 may implement continuous authorization functionality to check whether the advisor asserts continuous authorization of relocation (e.g., detecting that a button or key has been pressed continuously, or without releasing the button or key). Graphical user interface 402 may implement charging functionality to detect whether a button or key has been pressed continuously for a sufficient amount of time to initiate a relocation session (avoiding any false relocation session initiations).

Graphical user interface 402 may receive an output plan computed by a planner of the vehicle, e.g., in arrow 232 from remote vehicle interface 170. The output plan may include the AV moving forward and in reverse and include multiple segments and optionally one or more transitions. The graphical user interface 402 may display shapes that correspond to different segments and/or transitions of the output plan. The shapes may be visually distinctive from each other to make it easier for the remote advisor to distinguish between the different segments and/or transitions of the output plan. Shapes may have different colors or shading. Opacity of the shapes in the graphical user interface 402 may differ. If a segment involves the AV driving in reverse, the shape for that segment may convey to the remote advisor that reverse is to be used for that segment. Displaying the path in the output plan in the graphical user interface 402 accurately may help the remote advisor better understand the projected travel of the AV. The visualization of the output plan may be static. The visualization of the output plan may be animated to illustrate the sequence of the segments and/or transitions to be completed.

Remote assistance 132 may include relocation command generator 404, which may translate user interaction with graphical user interface 402 into relocation commands in accordance with the application programming interface of the remote vehicle interface 170. Relocation command generator 404 may generate relocation commands based on the user input (e.g., received via graphical user interface 402). Relocation command generator 404 may transmit the relocation commands to remote vehicle interface 170, via arrow 230.

Remote assistance 132 may include relocation command validation 406, which may perform checks to ensure that the relocation command is valid. Relocation command validation 406 may determine whether the relocation commands generated by the relocation command generator are valid. In some cases, relocation command validation 406 may perform checks to determine whether the user input is valid (e.g., given a current state of a relocation session). The checks may include checking whether a generated relocation command is a valid command given a current relocation state. The checks may include checking whether the AV is stationary (e.g., ready) to initiate relocation. The checks may include checking whether the AV is in the right gear (e.g., in drive) to initiate relocation. The checks may include checking whether the AV is in the process of shifting gears, and therefore the AV is not ready to begin relocation. The graphical user interface 402 may inform the remote advisor that relocation cannot be initiated, and the remote advisor may wait until the AV has completed shifting to a new gear. The checks may include checking whether an advisor is authorized to make relocation commands. The checks may include checking whether an advisor is authorized to execute an output plan that requires an advisor with a certain expert level. The checks may include checking whether an advisor is authorized to execute relocation commands that require an advisor with a certain expert level. Certain relocation commands may request the freespace planner to operate in a specific expert mode. If the relocation command validation 406 determines that the relocation command is invalid, the graphical user interface 402 may output an indication to a remote advisor indicating that the relocation command is invalid and optionally reason(s) why the relocation command was invalid.

Remote assistance 132 may include a target pose checker 408 to perform checks on the target relocation pose provided by the remote advisor as user input via the graphical user interface. The checks may include checking whether the target relocation pose is valid. The checks may include checking whether the target relocation pose is near or in an intersection. The checks may include determining whether a target relocation pose provided in the user input from the remote advisor is within a first allowed region in front of the vehicle and a second allowed region behind the vehicle. The checks may include checking whether the position of target relocation pose is within a certain distance threshold (e.g., 10 meters) from the current position of the AV. The checks may include checking whether the orientation/heading of the target relocation pose is within a certain angle threshold (e.g., 270 degrees) from the current pose of the AV. If the target relocation pose is invalid, the graphical user interface 402 may indicate to the remote advisor that a new target relocation pose is needed and that the previously indicated target relocation pose is invalid. Optionally, the reason for why the target relocation pose is invalid may be conveyed to the remote advisor via the graphical user interface 402. If the target relocation pose is invalid, the target pose checker 408 may prevent the relocation command generator 404 from generating and transmitting a relocation command to request an output plan to be computed.

Remote assistance 132 may include a computed output plan checker 410 to perform checks on the computed output plan from one of the motion planners of the AV. The checks may include determining whether the output plan is valid (e.g., whether the output plan violates any of the application requirements for relocation). The checks may include determining whether the output plan would cause the vehicle to reverse in or into an intersection. The checks may include determining whether the output plan would cause the vehicle to reverse in or into a crosswalk. If the computed output plan is invalid, the graphical user interface may indicate to the remote advisor that a new target relocation pose is needed (e.g., to trigger a motion planner to compute a new output plan), and that the computed output plan may violate one or more application requirements of relocation.

In some embodiments, the freespace planner or another suitable component in the AV may perform functionalities of the computed output plan checker 410. If an output plan is determined to be invalid, the freespace planner or another suitable component may report, e.g., to remote assistance 132, that a valid output plan cannot be computed.

Remote assistance 132 may include execution time estimator 412. Execution time estimator 412 may process path information in the computed output plan and vehicle controls information 226 (from vehicle control stack) to determine estimated execution time of a computed output plan. Execution time estimator 412 may process path information in the computed output plan (e.g., provided in arrow 232) and vehicle controls information 226 to determine respective expected durations for the vehicle to complete different segments and/or different transitions of an output plan computed for the relocation session. Execution time estimator 412 may process timing information in the computed output plan (e.g., provided in arrow 232) to determine respective expected durations for the vehicle to complete different segments and/or transitions of an output plan computed for the relocation session. An expected duration for an AV to complete a segment may include an expected duration for the AV to drive forward to complete the segment. An expected duration for an AV to complete a segment may include an expected duration for the AV to drive in reverse to complete the segment. An expected duration for an AV to complete a transition between segments may include an expected duration for the AV to change gears while remaining stationary. An expected duration for an AV to complete a transition between segments may include an expected duration for the AV to change gears and turn the steering wheel while remaining stationary. Expected duration(s) may be displayed to the remote advisor in a meaningful way using the graphical user interface 402.

In some embodiments, the freespace planner in the AV may perform functionalities of the execution time estimator 412. An output plan generated by the freespace planner of the AV may include timing information (e.g., timestamps). For example, each segment and each pose of a segment's trajectory can include a future time at which the freespace planner expects the AV to be in that pose. In some cases, the vehicle controls information 226 may be used by the freespace planner to compute the timing information of an output plan. The timing information can be used to determine expected duration(s) of the output plan. The timing information can be used to determine expected durations of segments and transition(s) of the output plan. The output plan along with the timing information can be provided from the freespace planner to the remote assistance 132 via remote vehicle interface 170. The execution time estimator 412 may calculate expected durations based on the timing information in the output plan. The expected durations can be displayed to the remote advisor in a meaningful way using the graphical user interface 402.

Before a remote advisor authorizes execution of an output plan, execution time estimator 412 and/or the freespace planner of the AV can determine an expected duration for the vehicle to traverse and complete an output plan computed for the relocation session. The expected duration may be a total amount of time for the vehicle to complete the full computed output plan. The expected duration may include different expected durations to complete different segments of the computed output plan. The expected duration may be calculated based on the lengths of the segments in the output plan. The expected duration may be calculated based on different maximum (or average) speeds of the AV when completing the segments in the output plan. Maximum or average speed of the AV when driving forward or in reverse may differ from one vehicle to another. Maximum or average speed of the AV when driving forward or in reverse may differ based on the operational design domain that the AV is in. Maximum or average speed of the AV when driving forward or in reverse may vary depending on the time of day. The expected duration of a transition between segments may be calculated based on gear shifting readiness of the AV. The expected duration of a transition between segments may be calculated based on an estimate of gear shifting duration of the AV.

During the execution of an output plan, execution time estimator 412 and/or freespace planner of the AV may update the expected duration for the vehicle to complete the (remaining) output plan. Execution time estimator 412 and/or freespace planner of the AV may update the expected duration for the vehicle to complete the remaining portion of a segment and/or transition in the computed output plan. The expected time(s) estimated by execution time estimator 412 and/or freespace planner of the AV may be updated based on vehicle controls information and path information of the remaining output plan. The expected time(s) estimated by execution time estimator 412 and/or freespace planner of the AV may be updated based on the amount of time that the AV has spent executing the output plan. The expected time(s) estimated by execution time estimator 412 and/or freespace planner of the AV may be updated based on an amount of distance or length of the segment traveled by the AV. The expected time(s) estimated by execution time estimator 412 and/or freespace planner of the AV may be updated based on time elapsed while the AV is completing a segment and/or a transition. If a motion planner updates the computed output plan, execution time estimator 412 and/or freespace planner of the AV may recalculate the expected duration(s) based on the updated output plan.

Figure 5:
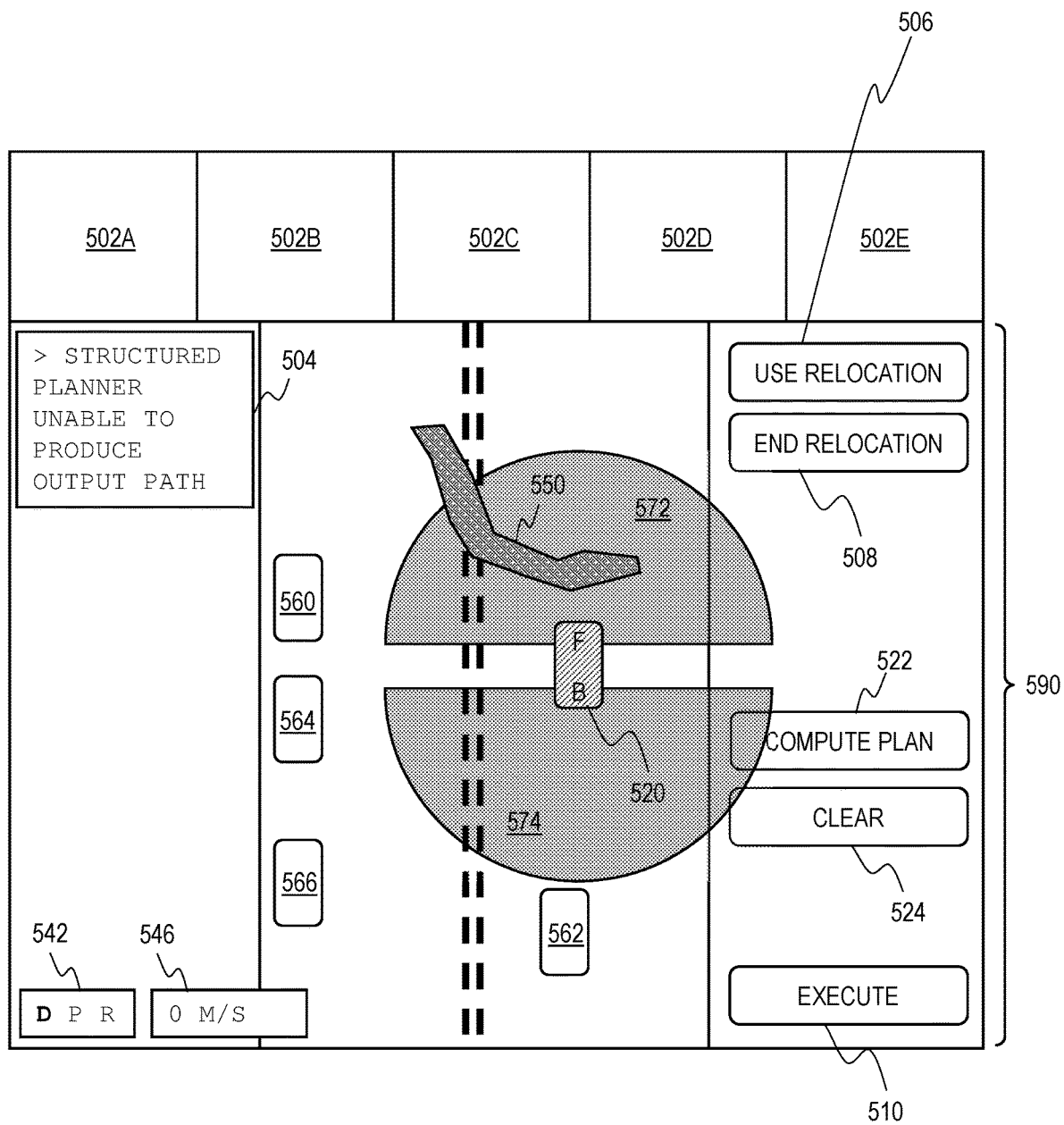
FIG. 5 illustrates an exemplary graphical user interface for remote assistance, according to some aspects of the disclosed technology.

Exemplary Graphical User Interface of Remote Assistance Part for Performing Relocation FIG. 5 illustrates an exemplary depiction of graphical user interface 402, according to some aspects of the disclosed technology. Graphical user interface 402 displays information to the advisor to request, authorize, and supervise relocation of an AV. Graphical user interface 402 includes user interface components that enables the advisor to command relocation of the AV.

Graphical user interface 402 may include areas 502A-502E, displaying sensor data feeds, such as images (e.g., images of live video feeds) from different cameras of an AV. Areas 502A-502E may display camera feeds from cameras that have a field of view in front of the AV (e.g., front 40 degrees camera, front left 40 degrees camera, front right 40 degrees camera, left side 40 degrees camera, and right side 40 degrees camera). Areas 502A-502E may be beneficial to the remote advisor when the remote advisor is authorizing and executing the AV to complete a segment of an output plan that moves the AV forward.

Graphical user interface 402 may include a map view 590 that shows the AV as shape 520 overlaid on a map (based on a current pose of the AV on the map). The map view 590 may show other tracked objects 560, 562, 564, and 566 (based on live information about tracked objects). The map view 590 may show detected occupied space 550 (e.g., detected obstacles) in the vicinity of the AV. The map view 590 may display semantic map information (e.g., road boundaries, lane boundaries, direction of travel, streetlights, etc.). Because the AV may drastically change its orientation when performing relocation that involves going forward and reverse, one or more visual (e.g., graphical or textual) indicators may be included on graphical user interface 402 to convey which side of the shape 520 is the front of the AV, and which side of the shape 520 is the back of the AV. In the example shown, a letter "F" is used to indicate the front side of the AV, and a letter "B" is used to indicate the backside of the AV. In some cases, an arrow shape can be used as the visual indicator.

Graphical user interface 402 may include an information display area 504 for displaying textual information that may assist the advisor. Textual information may be based on vehicle state information, vehicle controls information, or any other information associated with the AV. Textual information may include information derived from scenario evaluation feedback (e.g., success or failure of a motion planner to produce a feasible output plan). Textual information may include vehicle events. Textual information may include relocation state information (e.g., AV is engaging with relocation, AV is disengaging with relocation, AV is moving, AV is awaiting pose, etc.). Textual information may include faults or fault conditions occurring on the AV (e.g., camera feed having a field of view behind the AV is malfunctioning, ultrasonic sensors in the back of the AV are malfunctioning, collision has been detected, etc.). Textual information may include vehicle controls information (e.g., AV is shifting gears, AV is in reverse gear, AV is in drive gear, AV is turning its steering wheel in place, AV is ready or not ready to shift gears (e.g., AV's gear shifting readiness), AV is unable to change gears at this time, etc.).

Graphical user interface 402 may include a "use relocation" button 506 as a user interface component. Pressing the "use relocation" button 506 may put the graphical user interface 402 in a relocation mode (e.g., the arrangement or display of the graphical user interface 402 may change to suit relocation, availability of certain user interface components may change to suit relocation, etc.). AV may engage relocation. AV may receive a start relocation request.

Graphical user interface 402 may include an "end relocation" button 508 as a user interface component. Pressing the "end relocation" button 508 may put the graphical user interface 402 in a normal remote assistance mode (e.g., the arrangement or display of the graphical user interface 402 may change to suit normal remote assistance, availability of certain user interface components may change to suit normal remote assistance, certain user interface components associated with relocation may be removed, etc.). AV may disengage relocation. AV may receive a stop relocation solution request.

Figure 7A:
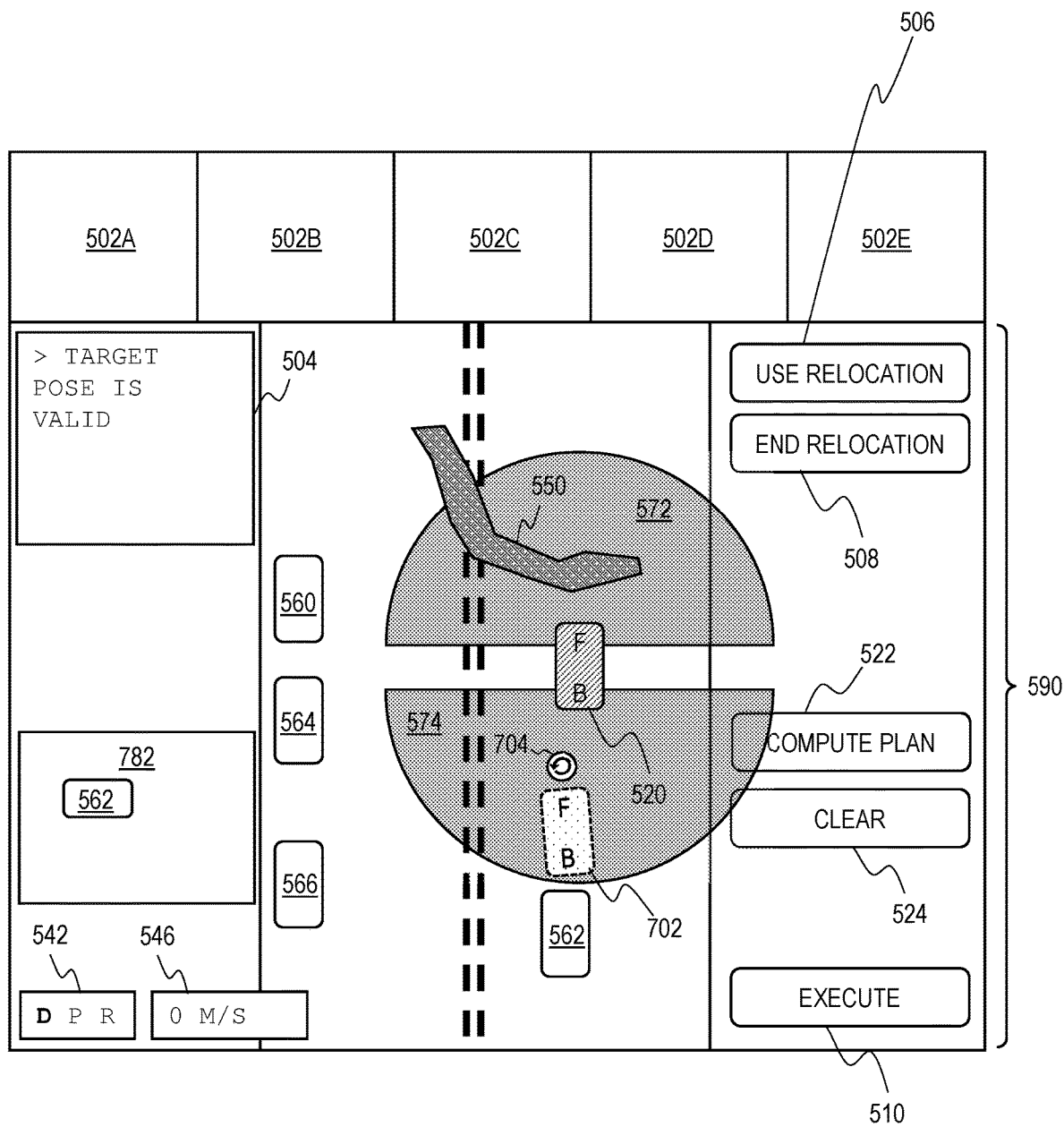
FIGS. 7A-C illustrate different exemplary displays of a graphical user interface for remote assistance, according to some aspects of the disclosed technology.
Figure 8A:
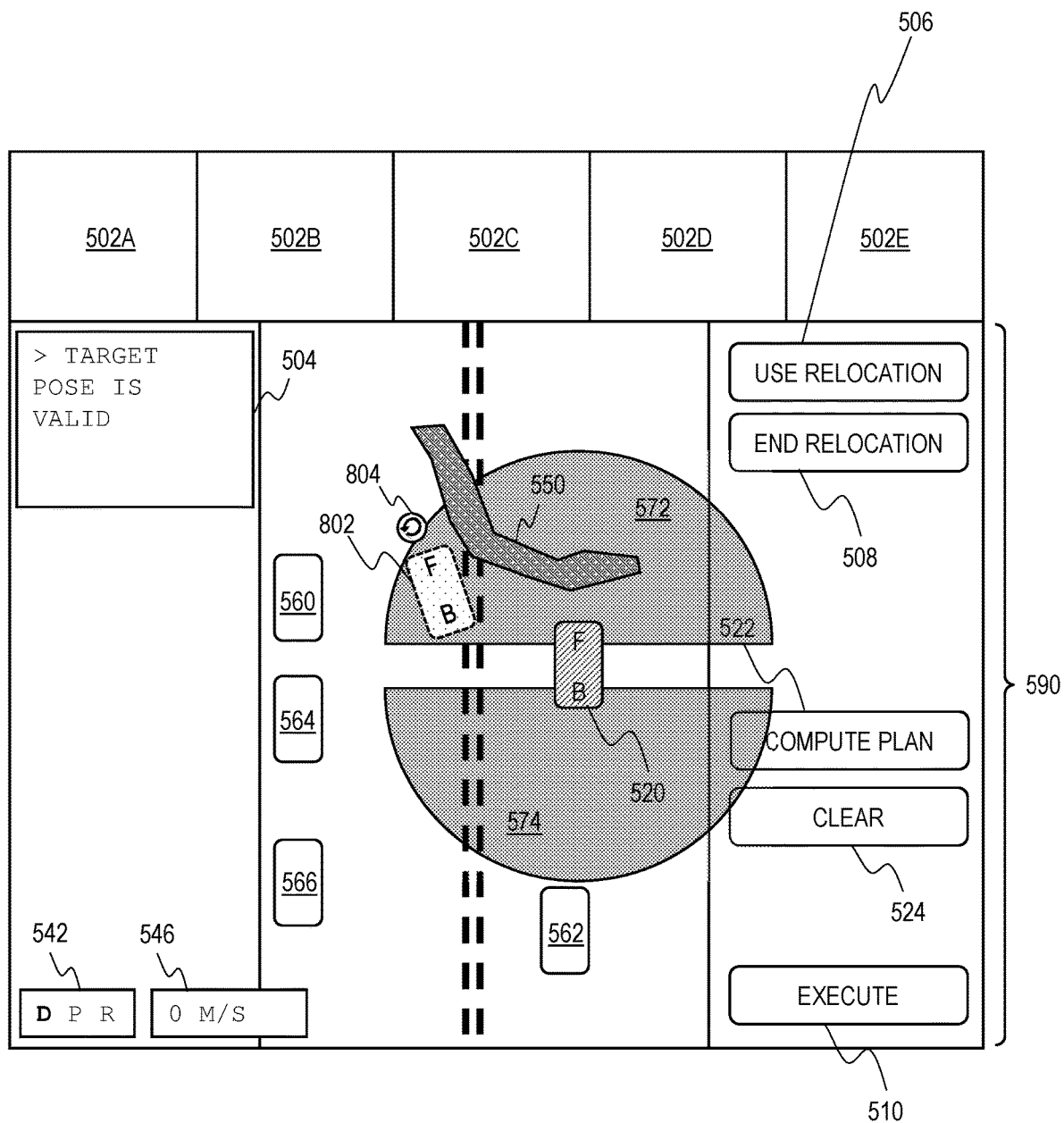
FIGS. 8A-E illustrate different exemplary displays of a graphical user interface for remote assistance, according to some aspects of the disclosed technology.

Graphical user interface 402 may include user interface components to allow an advisor to input a desired target relocation pose. A remote advisor may drag and drop the AV on the map view 590 to indicate the target relocation pose. Exemplary illustrations of the graphical user interface 402 illustrating target relocation poses provided by a remote advisor are shown in FIGS. 7A and 8A.

Graphical user interface 402 may include visual indicators to convey to a remote advisor that the AV can be relocated to a target relocation pose in front of the AV and behind the AV. The AV may be eligible to be relocated to a circular or oval-shaped allowed region around the AV. The AV may be eligible to be relocated to a first allowed region in front of the vehicle and a second allowed region behind the vehicle. The allowed region may be defined by an allowed execution radius for relocation. The allowed region may be visually conveyed to the remote advisor as a circular shape, semi-circular shape, or a cone-like shape. In some embodiments, the graphical user interface 402 may display a shape 572 indicating possible target relocation poses in front of the vehicle, and a shape 574 indicating possible target relocation poses behind the vehicle. The shapes 572 and 574 may be semicircular. The shapes 572 and 574 may be arc or arch shaped. The shapes 572 and 574 may be cone shaped. The shapes 572 and 574 may be displayed adjacent to shape 520 representing the AV. The shapes 572 and 574 may convey to the remote advisor that acceptable target relocation poses are within the regions indicated by the shapes 572 and 574, so that the remote advisor may input target relocation poses within the regions indicated by the shapes 572 and 574. The shapes 572 and 574 may convey to the remote advisor that the AV may be able to compute output plans that allows the AV to relocate to a location in front of and/or behind the AV.

Graphical user interface 402 may include a "compute plan" button 522 as a user interface component. Pressing or selecting the "compute plan" button 522 may cause the AV (e.g., a freespace planner) to compute a feasible output plan to the indicated target relocation pose. AV may receive a generate relocation solution request to compute an output plan. The path information of a computed output plan may be visualized or displayed in the graphical user interface 402.

Graphical user interface 402 may include a "clear" button 524 as a user interface component. Pressing or selecting the "clear" button 524 may cause the AV clear target relocation pose. AV may receive a reset relocation solution request. Location of shape representing a target relocation pose in graphical user interface 402 may reset to the current pose of the AV (e.g., overlapping with shape 520). An advisor may input a new target relocation pose after clearing the target relocation pose.

Graphical user interface 402 may include an "execute" button 510 as a user interface component. Pressing the "execute" button 510 and holding/charging the "execute" button 510 may authorize an output plan generated by a freespace planner to be executed. AV may receive an execute relocation solution request to execute the authorized output plan. Continuous holding the "execute" button 510 may ensure that the AV continues to execute the authorized output plan. The AV may receive a stream of execute relocation solution requests. The stream of requests may have a certain cadence, e.g., 2 Hz or another suitable frequency. When the stream of requests is no longer being received by the AV at or above the cadence, the AV may determine that the output plan is no longer authorized and may gracefully come to a stop.

Graphical user interface 402 may receive an indication of a current gear of the vehicle (e.g., in vehicle controls information 226, and/or in arrow 232). The graphical user interface 402 may display a visual indication (illustrated as visual indicator 542) indicating a current gear of the vehicle to the remote advisor. The visual indicator 542 may accentuate the graphic or text indicating the current gear to convey which gear is active.

Graphical user interface 402 may receive an indication of a current speed of the vehicle (e.g., in vehicle controls information 226, and/or in arrow 232). The graphical user interface 402 may display a visual indication (illustrated as visual indicator 546) indicating a current speed of the vehicle to the remote advisor. The visual indicator 546 may show a numerical value for a current speed of the AV (e.g., in miles per hour, kilometers per hour, or meters per second, etc.). The visual indicator 546 may alternatively convey the current speed in the form of an odometer.

Exemplary End-to-End Workflow Between Remote Assistance and the AV

Figure 6:
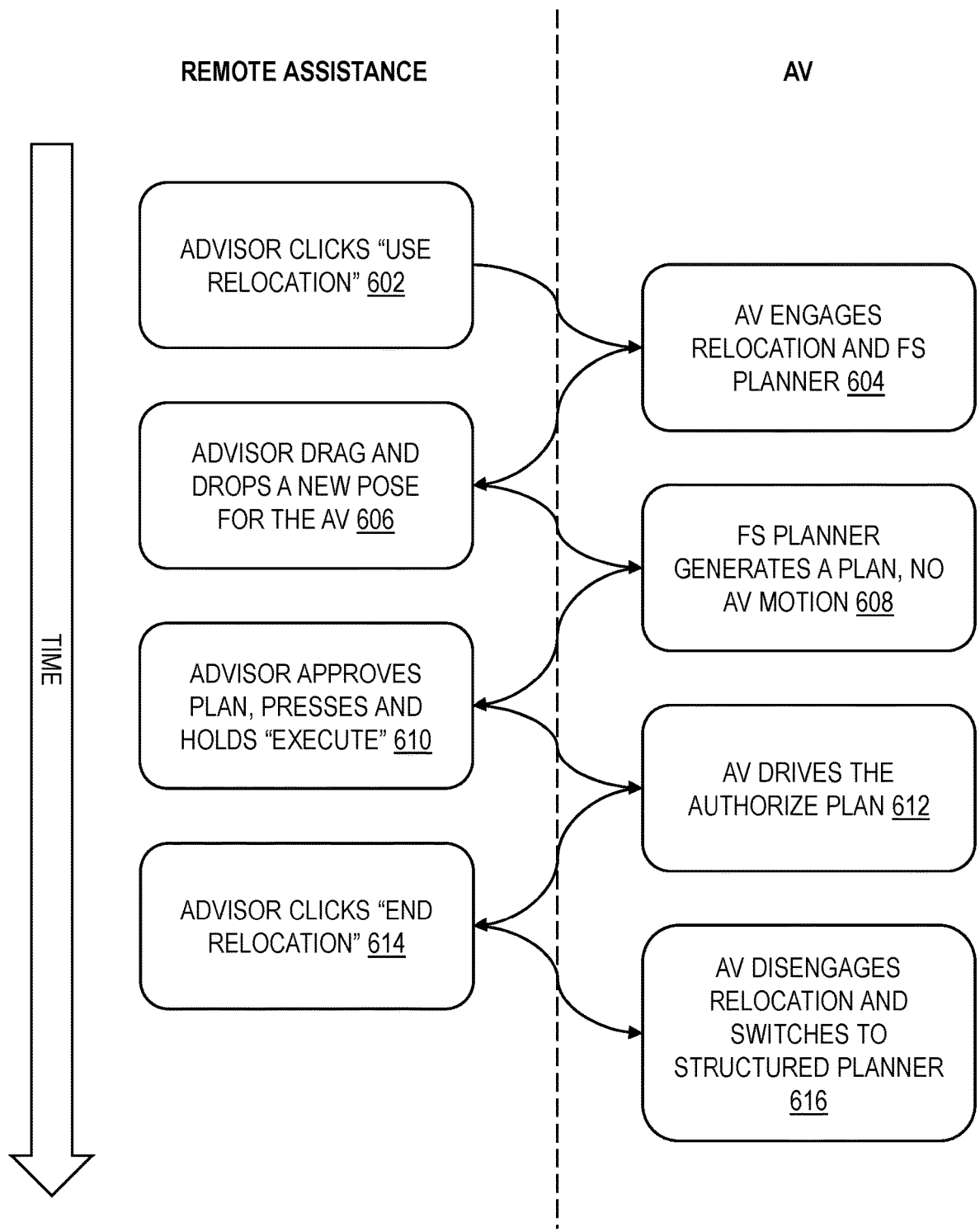
FIG. 6 illustrates an end-to-end workflow of a remote relocation session, according to some aspects of the disclosed technology.

FIG. 6 illustrates an end-to-end workflow of a remote relocation session, according to some aspects of the disclosed technology. The workflow may involve using the graphical user interface 402 illustrated in FIGS. 4-5. The workflow may involve triggering relocation workflow described with FIGS. 1-3. In 602, advisor may click "use relocation" on a graphical user interface. In 604, AV may engage relocation and freespace planner. In 606, advisor may drag and drop a new pose for the AV on the graphical user interface. In 608, freespace planner may generate an output plan. AV does not move. In 610, advisor may approve the output plan by pressing and holding "execute" on the graphical user interface. In 612, AV may drive the authorized output plan. In 614, advisor may click "end relocation" on the graphical user interface. In 616, AV may disengage relocation and switch control back to structured planner.

Figure 7B:
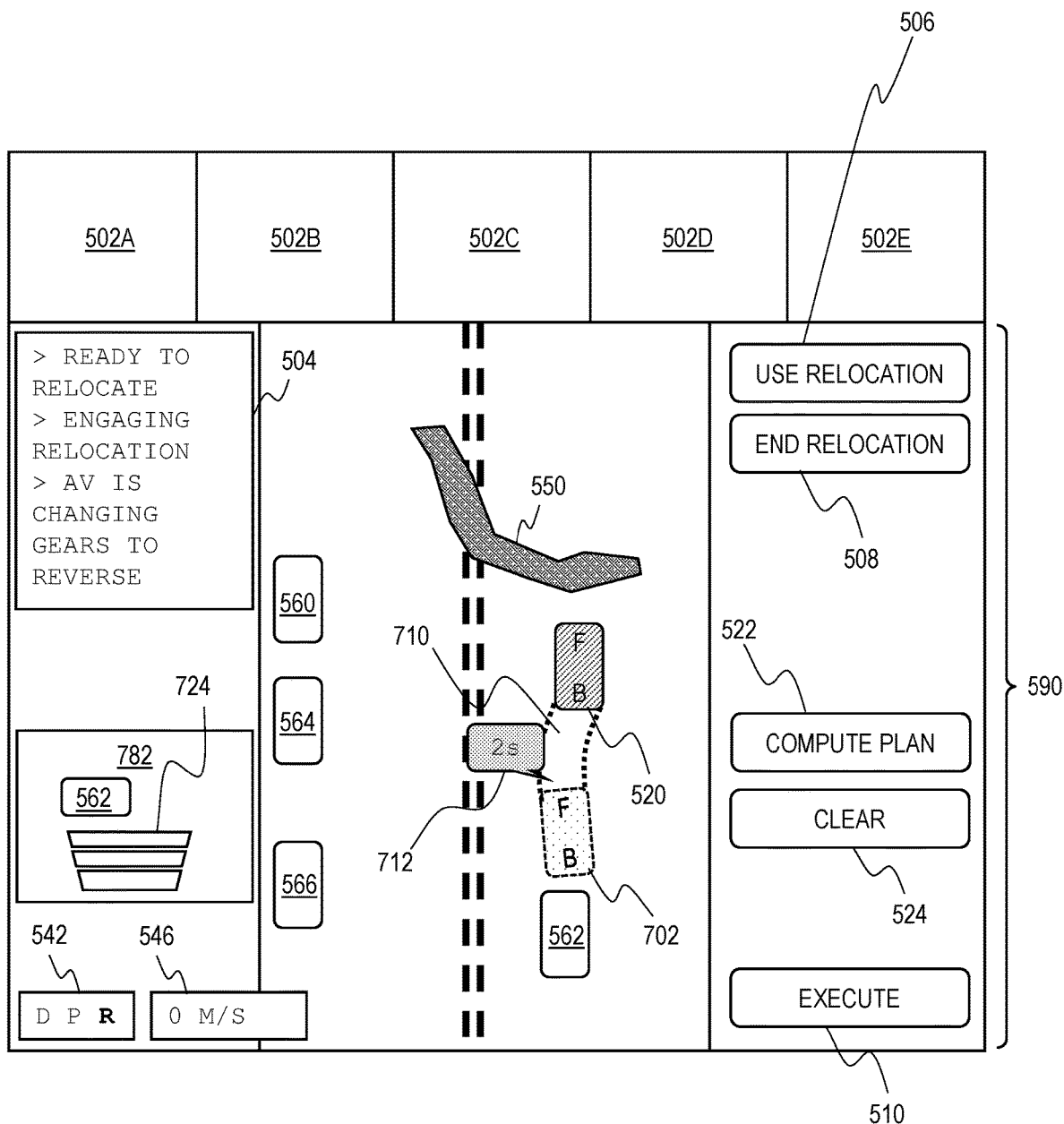
Figure 7C:
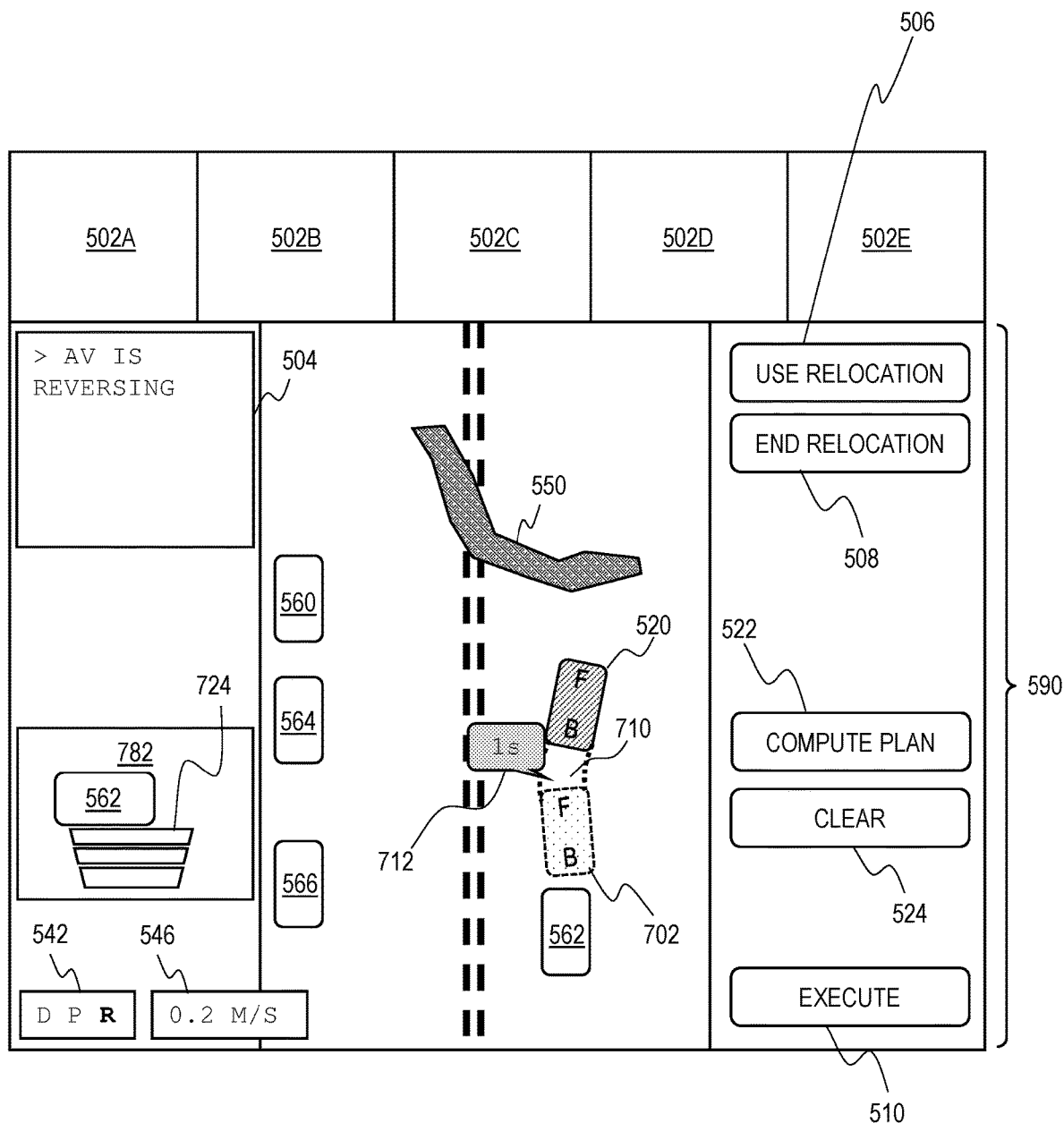

Exemplary Displays of Graphical User Interface of Remote Assistance Part Having Various Visual Indicators FIGS. 7A-C illustrate different exemplary displays of a graphical user interface (e.g., graphical user interface 402 of FIG. 4) for remote assistance, according to some aspects of the disclosed technology. FIG. 7A illustrates a remote advisor inputting a target relocation pose. FIG. 7B illustrates a visualization of a computed output plan and initiating driving in reverse. FIG. 7C illustrates visualization of the AV as the AV moves to complete relocation.

In FIG. 7A, a remote advisor may input a target relocation pose by dragging and dropping the AV (e.g., shape 520 on map view 590) and allow the advisor to be able to visually place shape 702 on map view 590 to indicate the desired target relocation position on the map view 590. The advisor can rotate shape 702 on map view 590 using the rotation user interface component 704 to indicate a desired target relocation orientation/heading.

In response to the remote advisor inputting a target relocation pose behind the AV (e.g., in region indicated by shape 574), the graphical user interface may display a camera feed in area 782 corresponding to a camera with a field of view behind the AV. The camera feed in area 782 may help the remote advisor see behind the AV as the remote advisor choose a target relocation pose behind the AV.

If the target relocation pose is acceptable to the remote advisor, the remote advisor may click "compute plan" button 522. Remote assistance platform may perform checks on the target relocation pose to determine its validity. In addition, the freespace planner may be instructed to compute an output plan based on the target relocation pose. The freespace planner may compute the output plan. The freespace planner may fail to find a feasible output plan and return a result (e.g., to scenario manager) indicating that the freespace planner cannot compute a plan to the target relocation pose. The scenario manager may return scenario evaluation feedback. The result and/or scenario evaluation feedback may be displayed to the remote advisor via the graphical user interface, e.g., in information display area 504.

In FIG. 7B, the graphical user interface may receive a computed output plan computed by a planner of the AV and generate a visualization to the remote advisor that conveys the path to be traveled by the AV to reach the target relocation pose. In this example, the computed output plan includes at least a segment where the AV drives in reverse to reach the target relocation pose. The computed output plan may include a starting transition where the AV changes gears and optionally turn the steering wheel in place. To complete the computed output plan, the AV may change its gear to reverse, optionally turn the steering wheel in place, and drive in reverse following the segment of the output plan while turning the steering wheel to reach the target relocation pose. The AV changing its gear to reverse and optionally turning the steering wheel in place may be considered an example of a starting transition. The starting transition is followed by the segment of the output plan where the AV drives in reverse. Graphical user interface may display shape 710 corresponding to the segment of the output plan that shows the path to be traveled by the AV. Shape 710 may include one or more visual features (e.g., a special color, a visual accent, etc.) to indicate to the remote advisor that the segment involves driving in reverse.

In some embodiments, an expected duration to complete the output plan is computed. The graphical user interface may display the expected duration (e.g., in a textual form in information display area 504) to the remote advisor. In some embodiments, an expected duration to complete a segment (illustrated by shape 710) may be computed. The graphical user interface may display the expected duration of the segment to the remote advisor adjacent to the shape 710 corresponding to the segment. In the exemplary display shown in FIG. 7B, the expected duration of the segment is 2 seconds, and a visual indicator 712 is displayed adjacent to shape 710 to indicate that the segment corresponding to shape 710 may be expected to take 2 seconds to complete or execute. In some embodiments, the expected duration for the starting transition (e.g., to change gears and optionally turn the steering wheel in place) in preparation for the segment where the AV drives in reverse may also be computed and displayed to the remote advisor through the graphical user interface.

If the computed output plan is acceptable to the remote advisor, the remote advisor may click and hold "execute" button 510 to begin execution of the computed output plan.

The graphical user interface may receive an indication that the AV is about to shift to a reverse gear. In advance of changing gears to reverse, the graphical user interface may adjust to display information to prepare the remote advisor. In some cases, the graphical user interface may display a visual indication indicating the current gear of the vehicle about to shift to the reverse gear (e.g., in information display area 504). In some cases, the graphical user interface may display a camera feed in area 782 corresponding to a camera with a field of view behind the vehicle in response to receiving the indication that the vehicle is about to shift to reverse gear. The graphical user interface may display the camera feed in area 782 as the AV (subsequently) moves to complete the segment in reverse, as illustrated in FIG. 7C. In some cases, the graphical user interface may display a visual indicator 724 that conveys information from one or more ultrasonic sensors with a field of view behind the vehicle, in response to receiving the indication that the vehicle is about to shift to the reverse gear. The information may indicate whether the area behind the vehicle is free of obstructions. The information may indicate a distance of the obstruction behind the vehicle (e.g., different portions of the visual indicator 724 may be shaded, accentuated, or colored differently to illustrate the distance of the obstruction). Visual indicator 724 may be superimposed or projected onto the camera feed in area 782. Visual indicator 724 may alternatively or additionally be placed behind the AV (e.g., shape 520) in map view 590. The graphical user interface may display the visual indicator 724 as the AV (subsequently) moves to complete the segment in reverse, as illustrated in FIG. 7C.

The graphical user interface may receive an indication that the AV is in reverse gear. The graphical user interface may adjust visual indicator 542 to indicate that the vehicle is in reverse gear. The visual indicator 542 may accentuate the graphic or text indicating the current gear (e.g., letter "R" in visual indicator 542) to convey the reverse gear is active. This adjustment to visual indicator 542 may not appear at the same time as other adjustments shown in FIG. 7B.

In FIG. 7C, the AV is driving in reverse to execute the segment of the output plan. As the AV moves, e.g., when executing relocation, the map view 590 may be updated, where shape 520 representing the AV's current pose may be updated. The relocation state information and/or indication that the AV is reversing may be displayed to the remote advisor in information display area 504. Shape 710 representing an output plan being executed may be updated to remove portions of the output plan the AV has traveled. Visual indicator 712 indicating an expected duration to complete the segment corresponding to visual indicator 712 may be updated with an updated expected duration as the AV travels the segment (e.g., 1 second remaining in the expected duration to complete the segment). Visual indicator 546 indicating a current speed may be updated with a current speed of the AV as the AV travels the segment.

Figure 8B:
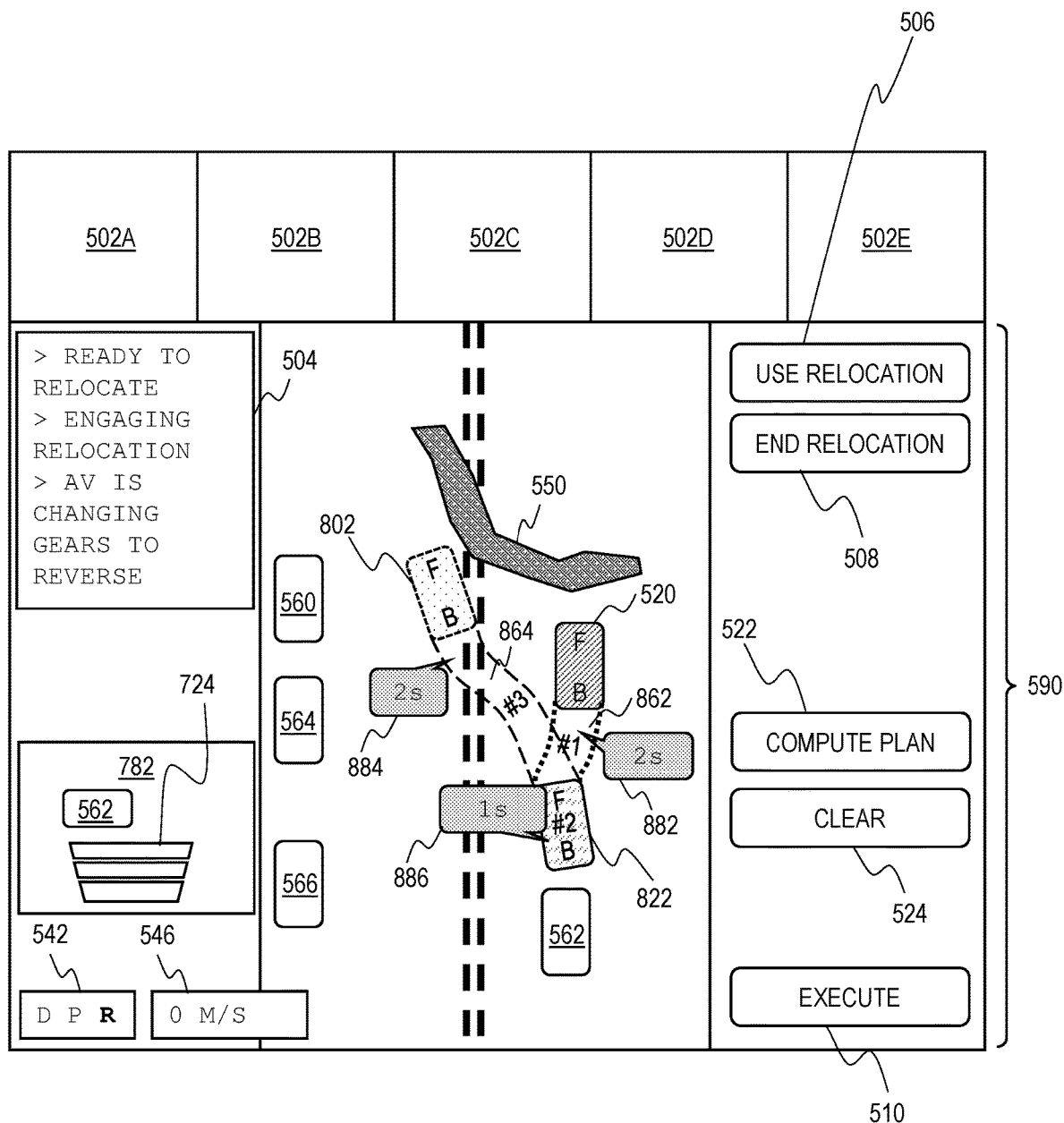
Figure 8C:
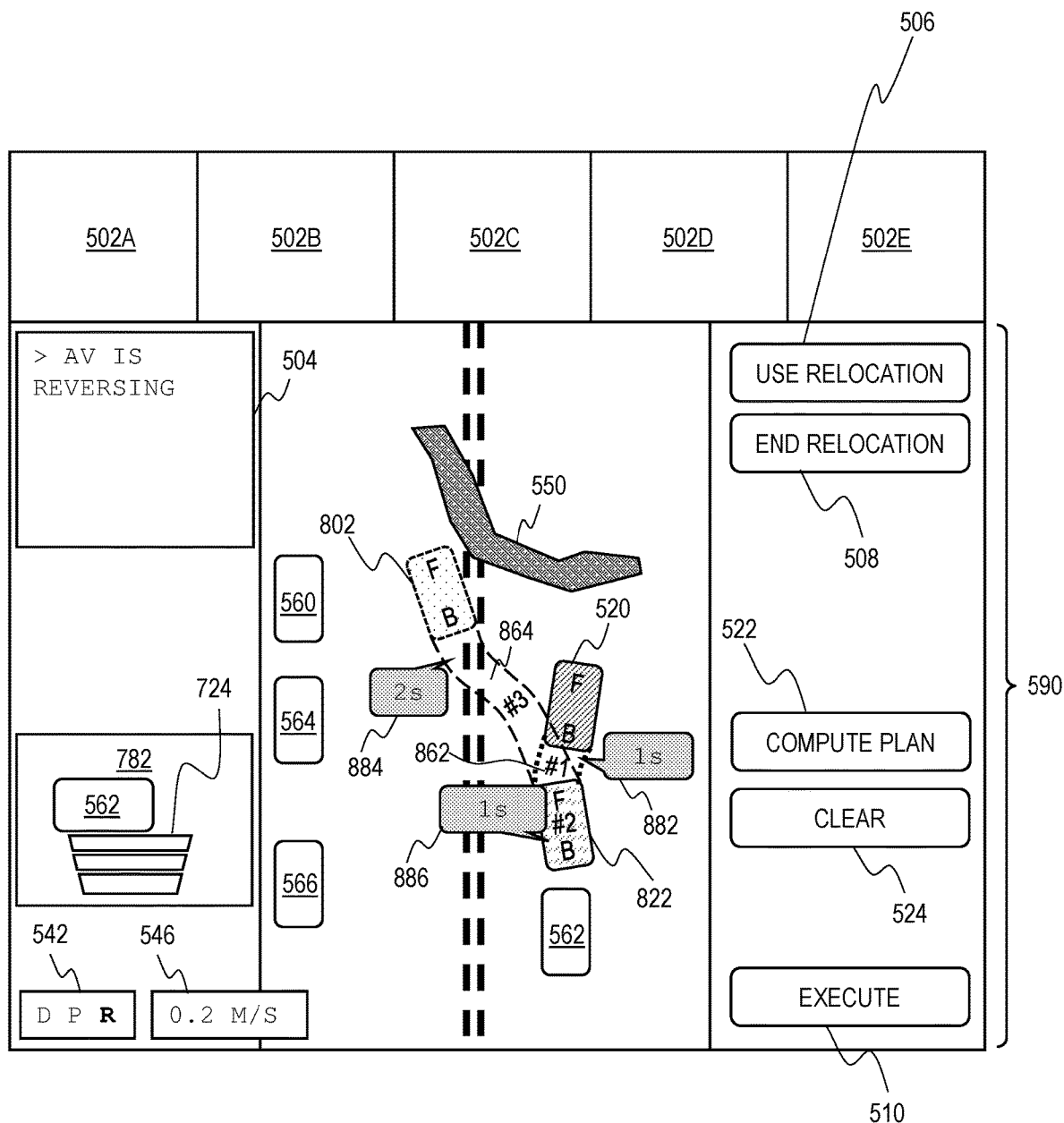
Figure 8D:
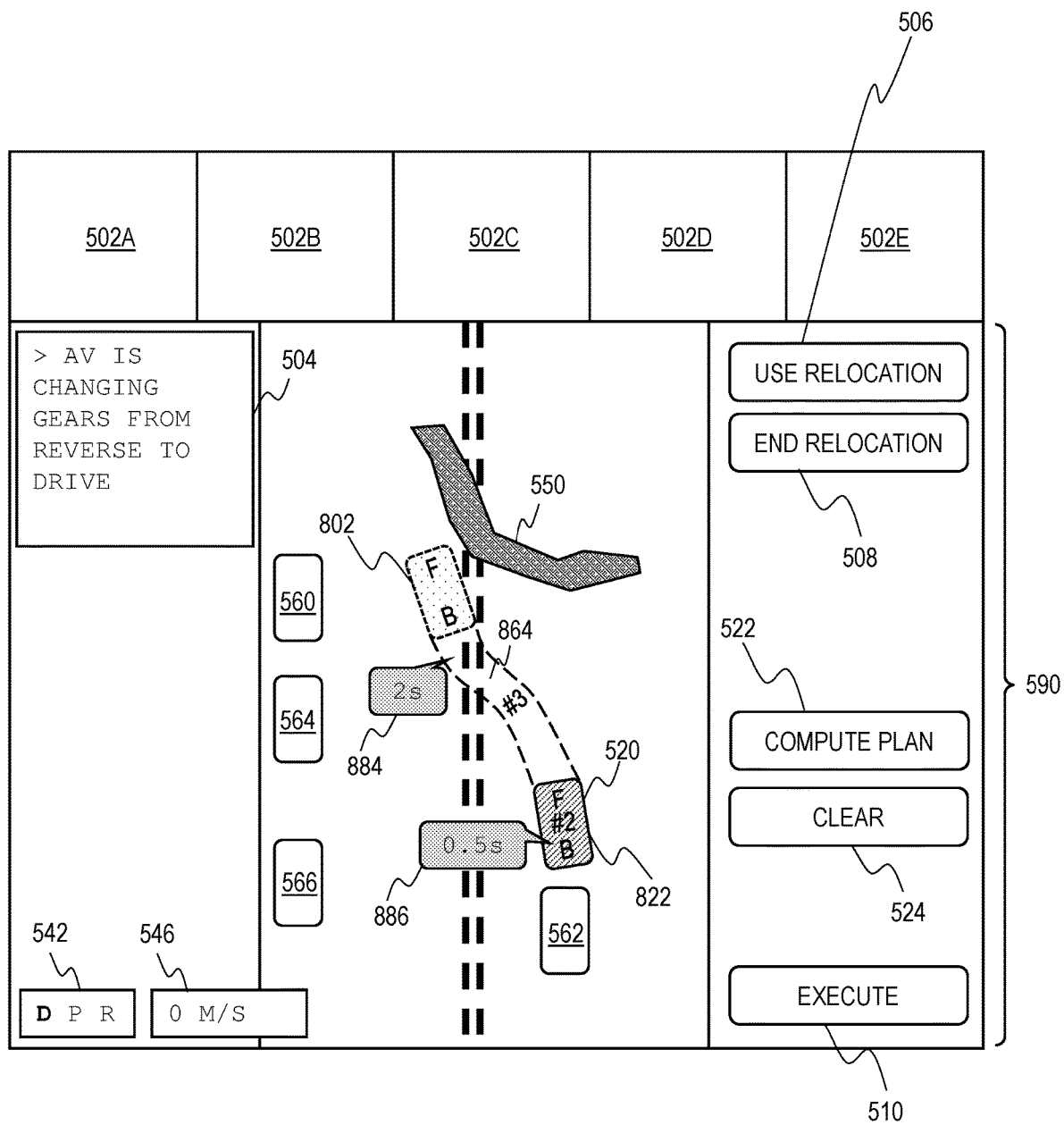

FIGS. 8A-E illustrate different exemplary displays of a graphical user interface (e.g., graphical user interface 402 of FIG. 4) for remote assistance, according to some aspects of the disclosed technology. FIG. 8A illustrates a remote advisor inputting a target relocation pose. FIG. 8B illustrates a visualization of a computed output plan and initiating driving in reverse. FIG. 8C illustrates visualization of the AV as the AV moves to complete a segment of the output plan. FIG. 8D illustrates visualization of the AV as the AV completes a transition of the output plan. FIG. 8D illustrates visualization of the AV as the AV completes a further segment of the output plan.

In FIG. 8A, a remote advisor may input a target relocation pose by dragging and dropping the AV (e.g., shape 520 on map view 590) and allow the advisor to be able to visually place shape 802 on map view 590 to indicate the desired target relocation position on the map view 590. The advisor can rotate shape 802 on map view 590 using the rotation user interface component 804 to indicate a desired target relocation orientation/heading. Similar to FIG. 7A, if the target relocation pose is acceptable to the remote advisor, the remote advisor may click "compute plan" button 522. Remote assistance platform may perform checks on the target relocation pose to determine its validity.

In FIG. 8B, the graphical user interface may receive a computed output plan computed by a planner of the AV) and generate a visualization to the remote advisor that conveys the path to be traveled by the AV to reach the target relocation pose. In this example, the computed output plan can include multiple segments and a transition between the segments. The computed output plan may include a starting transition where the AV changes gears. The output plan may include a first transition where the AV changes gear (from drive) to reverse, and optionally turns the steering wheel in place (shown as shape 520). The output plan may include a second segment where the AV drives in reverse following a second segment of the output plan while turning the steering wheel to reach a first intermediate pose (first intermediate pose is shown as shape 822). The output plan may include a third transition where the AV changes gear (from reverse) to drive, and optionally turns the steering wheel in place. The output plan may include a fourth segment where the AV drives forward following the fourth segment of the output plan while turning the steering wheel to reach the target relocation pose.

Graphical user interface may display different shapes corresponding to different segments of the output plan. Graphical user interface may display shape 520 (current pose of the AV), which may correspond to the first transition where the AV changes gear (from drive) to reverse, and optionally turns the steering wheel in place. Graphical user interface may display shape 862, which may correspond to the second segment where the AV drives in reverse following the second segment of the output plan while turning the steering wheel to reach a first intermediate pose (first intermediate pose is shown as shape 822). Shape 862 may convey a path to be traveled by the AV to complete the second segment. Graphical user interface may display shape 822, which may correspond to the third transition where the AV changes gear (from reverse) to drive, and optionally turns the steering wheel in place. Graphical user interface may display shape 864, which may correspond to the fourth segment where the AV drives forward following the fourth segment of the output plan while turning the steering wheel to reach the target relocation pose (shown as shape 802). Shape 864 may convey a path to be traveled by the AV to complete the fourth segment.

Shape 862 may include one or more visual features (e.g., distinct color, visual accent, etc.) to indicate to the remote advisor that the segment involves driving in reverse. Shape 862 and 864 may be visually different or distinct from each other to convey that one segment involves driving forward and the other segment involves driving in reverse.

The computed output plan includes the different segments and transition(s) to be completed in a sequence or order. In the example illustrated, the computed output plan may include, in this order: a first transition, a second segment, a third transition, and a fourth segment. Visual indicators showing sequence numbers corresponding to the segments and transition to be completed may be displayed adjacent to the shapes representing the segments. For example, a textual indicator having "#1" may be displayed with shape 862, a textual indicator having "#2" may be displayed with shape 822, and a textual indicator having "#3" may be displayed with shape 864 to indicate the sequence or order in which the segments and transition are provided/arranged in the computed output plan. In some cases, the graphical user interface may animate the segments and transition (to display the segments and transition sequentially) and convey the sequence or order of the segments and transition visually to the remote advisor.

In some embodiments, an expected duration to complete the output plan is computed. The graphical user interface may display the expected duration (e.g., in a textual form in information display area 504) to the remote advisor. In some embodiments, expected durations to complete respective segments and transitions (illustrated by visual indicators 882, 884, and 886) may be computed. Though not shown, the first transition may have a visual indicator in the graphical user interface that conveys the expected duration of the first transition. The graphical user interface may display a given expected duration of the segment or transition to the remote advisor adjacent to a shape corresponding to the segment or transition. In the exemplary display shown in FIG. 8B, the expected duration to complete the second segment may be 2 seconds, and a visual indicator 882 can be displayed adjacent to shape 862 to indicate that the segment corresponding to shape 862 may be expected to take 2 seconds to complete or execute. In some embodiments, the expected duration of the third transition where the AV changes gears and optionally turns the steering wheel in place (corresponding to shape 822) in preparation for the fourth segment where the AV drives forward may also be displayed to the remote advisor through the graphical user interface. The expected duration to complete the third transition may be 1 second, and a visual indicator 886 may be displayed adjacent to shape 822 to indicate that the third transition corresponding to shape 822 may be expected to take 1 second to complete or execute. The expected duration to complete the fourth segment may be 2 seconds, and a visual indicator 884 may be displayed adjacent to shape 864 to indicate that the segment corresponding to shape 864 may be expected to take 2 seconds to complete or execute.

If the computed output plan is acceptable to the remote advisor, the remote advisor may click and hold "execute" button 510 to begin execution of the computed output plan.

The graphical user interface may receive an indication that the AV is about to shift to a reverse gear. In advance of changing gears to reverse, the graphical user interface illustrated in FIG. 8B may adjust to display information to prepare the remote advisor, in a similar manner as illustrated in FIG. 7B (e.g., making adjustments to information display area 504, displaying a camera feed in area 782, and displaying visual indicator 724).

The graphical user interface may receive an indication that the AV is in reverse gear. The graphical user interface illustrated in FIG. 8B may adjust in a similar manner as illustrated in FIG. 7B (e.g., making adjustments to visual indicator 542). This adjustment to visual indicator 542 may not appear at the same time as other adjustments shown in FIG. 8B.

In FIG. 8C, the AV is driving in reverse to execute the second segment of the output plan. The graphical user interface may adjust in a similar manner as illustrated in FIG. 7C. As the AV moves, e.g., when executing relocation, shape 862 representing a segment of the output plan being executed may be updated to remove portions of the segment in the output plan the AV has traveled. Visual indicator 882 indicating an expected duration to complete the segment corresponding to visual indicator 882 may be updated with an updated expected duration as the AV travels the segment (e.g., 1 second remaining in the expected duration to complete the segment). Visual indicator 546 indicating a current speed may be updated with a current speed of the AV as the AV travels the segment.

Figure 8E:
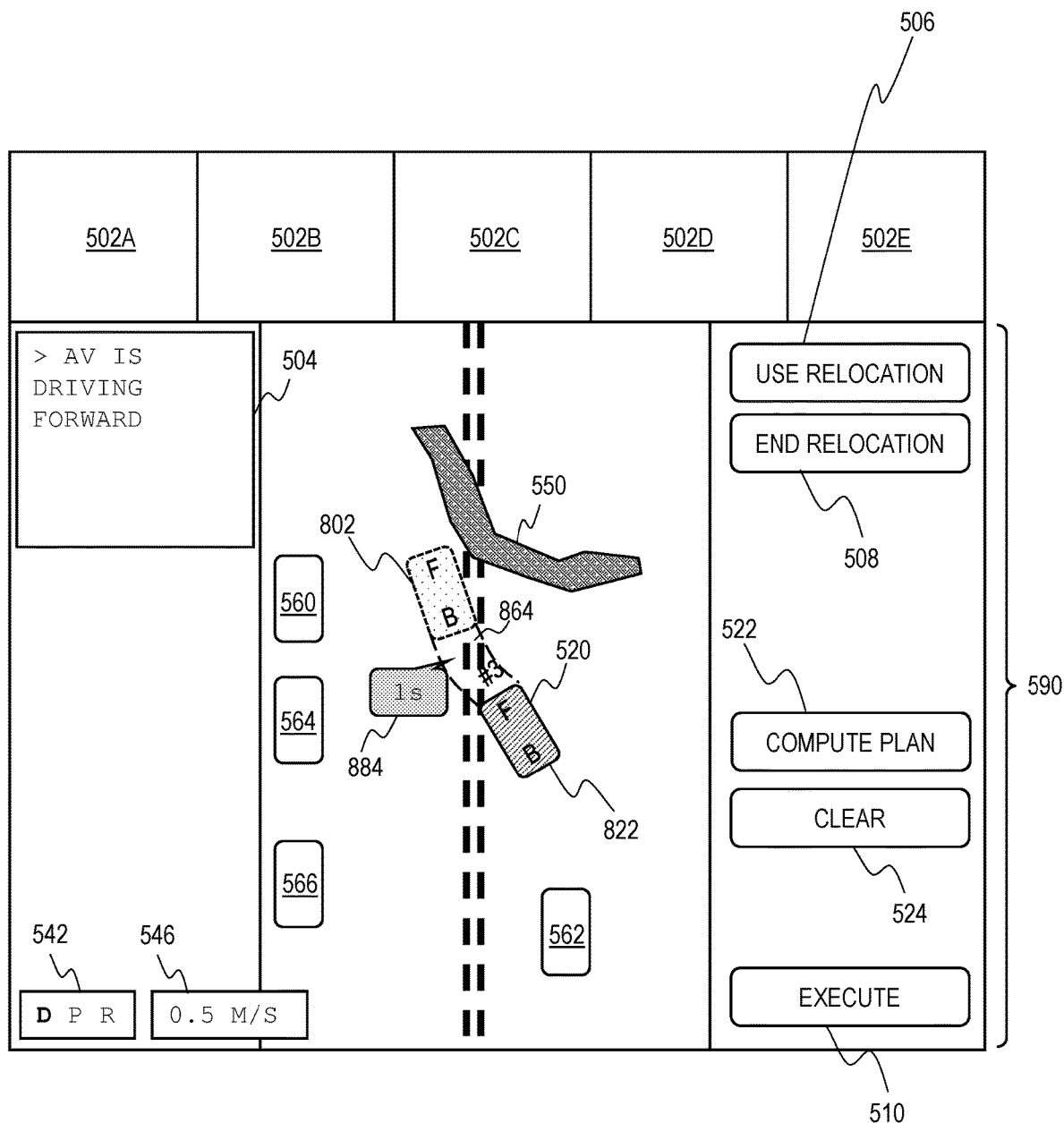

In FIG. 8D, the AV is stationary to execute the third transition of the output plan. The AV may change gears and optionally turn the steering wheel in this transition, as indicated by shape 822. The graphical user interface may receive an indication that the AV is about to shift (from reverse) to a drive gear. The graphical user interface illustrated in FIG. 8D may adjust to inform the remote advisor that the AV is changing gears. In some cases, the graphical user interface may display a visual indication indicating the current gear of the vehicle about to shift (from reverse) to the drive gear (e.g., in information display area 504). In some cases, the graphical user interface may remove a camera feed previously shown in area 782 corresponding to a camera with a field of view behind the vehicle in response to receiving the indication that the vehicle is about to shift to drive gear. The camera feed previously shown in area 782 may be omitted from the graphical user interface seen in FIG. 8D, as the AV subsequently drives forward, as illustrated in FIG. 8E. Removing the camera feed removes extraneous information that the remove advisor may not need to process to continue authorizing the execution of the output plan. In some cases, the graphical user interface may remove a visual indicator 724 that conveys information from one or more ultrasonic sensors with a field of view behind the vehicle, in response to receiving the indication that the vehicle is about to shift to the drive gear. The visual indicator 724 may be omitted from the graphical user interface seen in FIG. 8D, as the AV subsequently drives forward, as illustrated in FIG. 8E.

As the AV completes the third transition involving gear changing and optionally turning the steering wheel in place, the visual indicator 886 may be updated with an updated expected duration to complete the transition (e.g., 0.5 second remaining in the expected duration to complete the transition).

The graphical user interface may receive an indication that the AV is in drive gear. The graphical user interface illustrated in FIG. 8D can adjust visual indicator 542 to indicate that the AV is in a drive gear. The visual indicator 542 may accentuate the graphic or text indicating the current gear (e.g., letter "D" in visual indicator 542) to convey the reverse gear is active. This adjustment to visual indicator 542 may not appear at the same time as other adjustments shown in FIG. 8D.

In FIG. 8E, the AV is driving forward to execute a fourth segment of the output plan. The segment is illustrated by shape 864. As the AV moves, e.g., when executing relocation, the map view 590 may be updated, where shape 822 representing the AV's current pose may be updated. The relocation state information and/or indication that the AV is driving forward may be displayed to the remote advisor in information display area 504. Shape 864 representing the segment being executed may be updated to remove portions of the segment that the AV has traveled. Visual indicator 884 indicating an expected duration to complete the segment corresponding to visual indicator 884 may be updated with an updated expected duration as the AV travels the segment (e.g., 1 second remaining in the expected duration to complete the segment). Visual indicator 546 indicating a current speed may be updated with a current speed of the AV as the AV travels the segment.

Exemplary Relocation Methods

Figure 9:
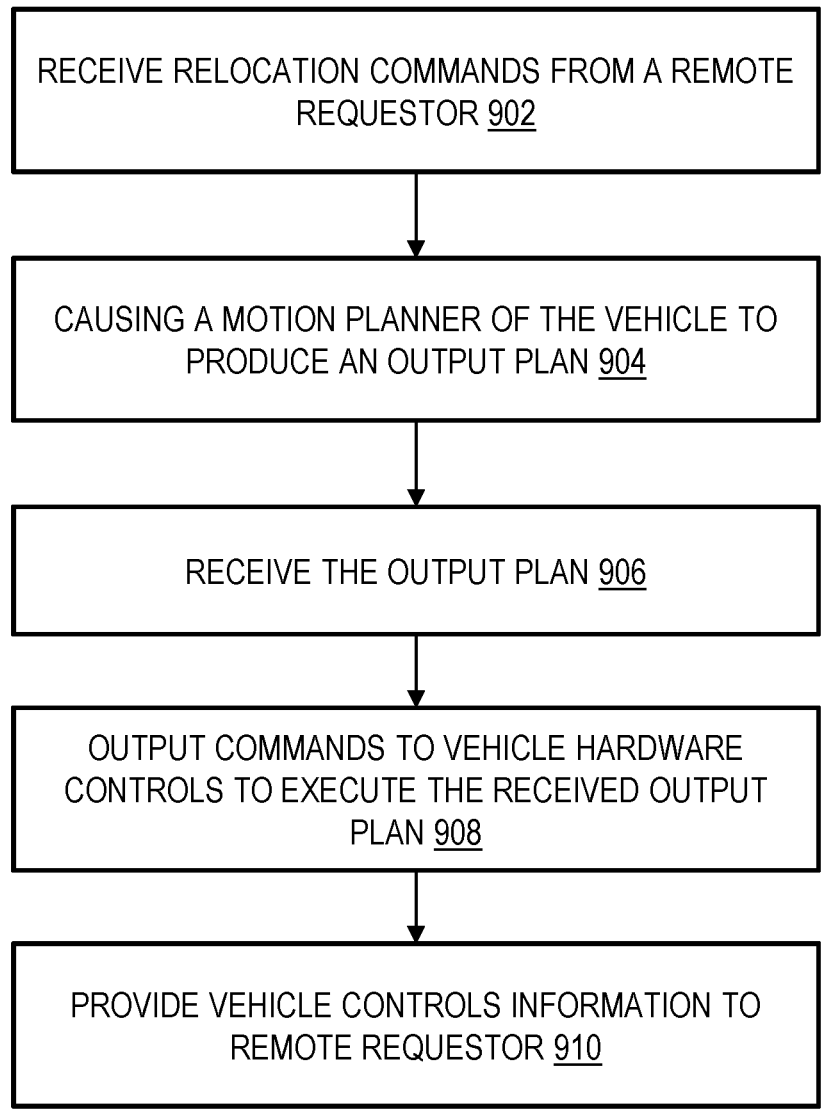
FIG. 9 is a flow diagram illustrating a computer-implemented method that can be performed by a vehicle, according to some aspects of the disclosed technology.

FIG. 9 is a flow diagram illustrating a computer-implemented method that can be performed by a vehicle, according to some aspects of the disclosed technology. The method may be carried out by and/or implemented in systems such as the AV management system 1100 of FIG. 11 and processor-based system 1200 of FIG. 12. In 902, a remote vehicle interface implemented on the vehicle may receive relocation commands from a remote requestor. In 904, in response to receiving relocation commands, the vehicle may cause a motion planner of the vehicle to produce an output plan involving the vehicle moving forward and in reverse. A scenario manager may be used to instruct the motion planner to produce the output plan. The motion planner may be a freespace planner, which can have fewer constraints than another motion planner on the vehicle. In 906, the vehicle control stack may receive the output plan. In 908, the vehicle control stack may output commands to vehicle actuators of the vehicle to execute the received output plan. In 910, vehicle controls information may be provided from the vehicle control stack via the remote vehicle interface to the remote requestor. The vehicle controls information may be used to inform a remote advisor managing a relocation session. The vehicle controls information may be visualized in a graphical user interface used by the remote advisor. Exemplary displays of the graphical user interface are illustrated in FIGS. 5, 7A-C, and 8A-E.

Figure 10:
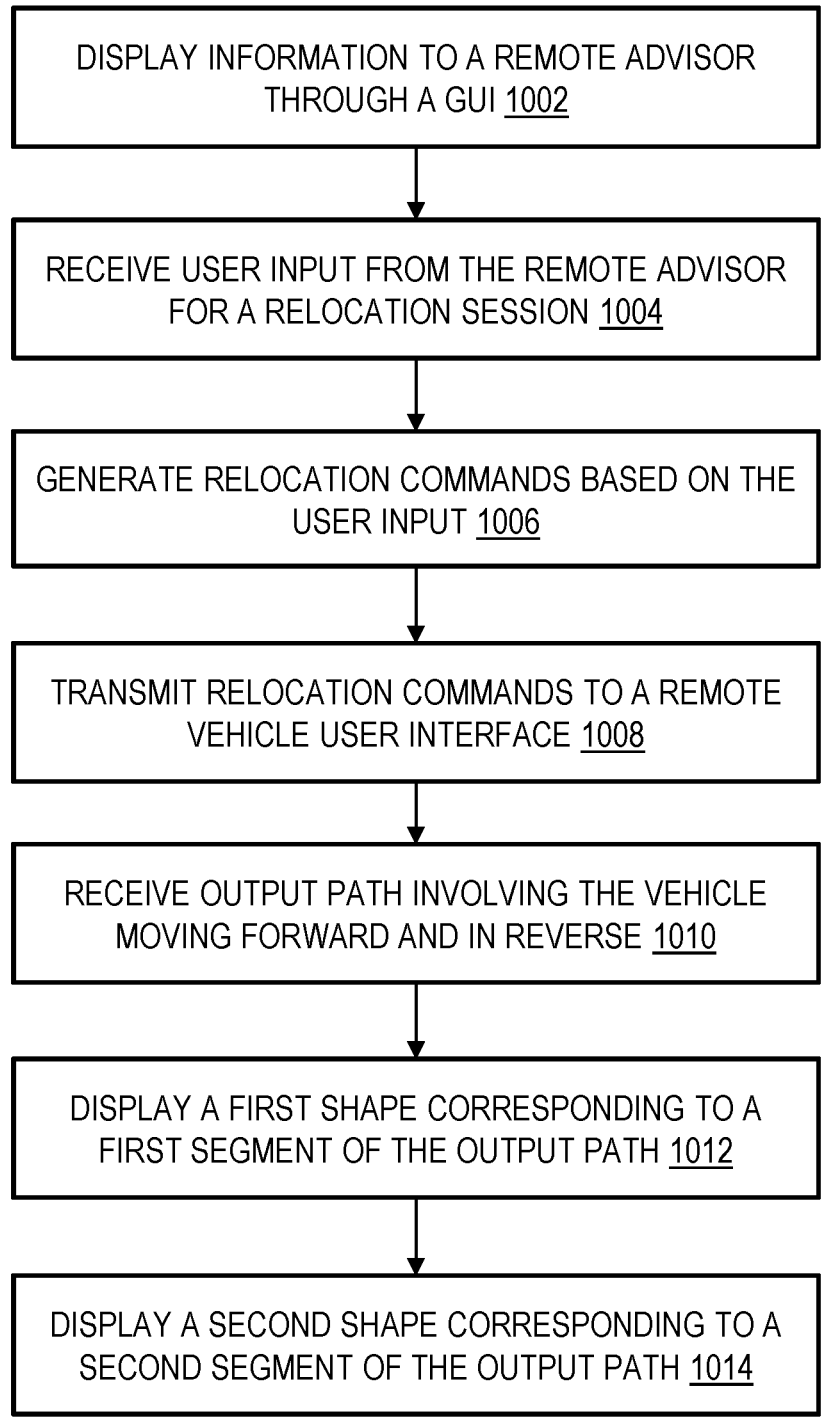
FIG. 10 is a flow diagram illustrating a computer-implemented method that can be performed by remote assistance as a remote requestor, according to some aspects of the disclosed technology.

FIG. 10 is a flow diagram illustrating a computer-implemented method that can be performed by remote assistance as a remote requestor, according to some aspects of the disclosed technology. The method may be carried out by and/or implemented in systems such as the AV management system 1100 of FIG. 11 and processor-based system 1200 of FIG. 12. In 1002, information may be displayed to remote advisor through a graphical user interface. Exemplary displays of the graphical user interface are illustrated in FIGS. 5, 7A-C, and 8A-E. In 1004, user input from the remote advisor for the relocation session may be received through the graphical user interface. In 1006, a relocation command generator may generate relocation commands based on the user input. In 1008, the relocation commands may be transmitted to a remote vehicle interface implemented on the vehicle. In 1010, an output plan computed by a planner of the vehicle may be received. The output plan may involve the vehicle moving forward and in reverse. In 1012, the graphical user interface may display a first shape corresponding to a first segment of the output plan. The first segment may involve the vehicle driving in a first direction (e.g., forward). In 1014, the graphical user interface may display a second shape visually different from the first shape corresponding to a second segment of the output plan. The second segment may involve the vehicle driving in a second direction opposite of the first direction (e.g., reverse).

Exemplary AV Management System

Figure 11:
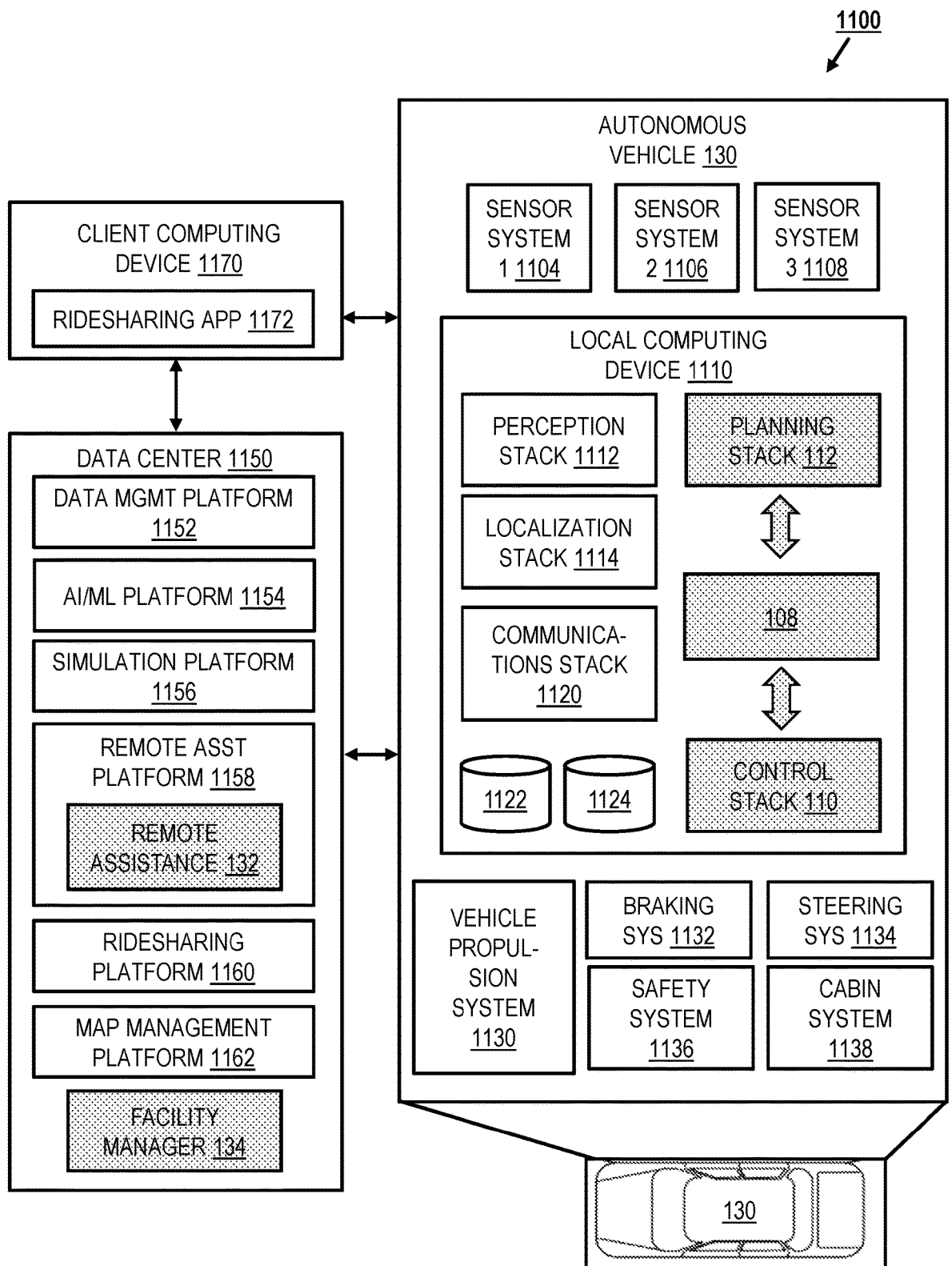
FIG. 11 illustrates an exemplary system environment that may be used to facilitate AV operations, according to some aspects of the disclosed technology.

Turning now to FIG. 11, this figure illustrates an example of an AV management system 1100, in which some of the aspects of the present disclosure can be implemented. One of ordinary skill in the art will understand that, for the AV management system 1100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1100 includes an AV 130, a data center 1150, and a client computing device 1170. The AV 130, the data center 1150, and the client computing device 1170 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 1104, 1106, and 1108. The sensor systems 1104-1108 may include different types of sensors and may be arranged about the AV 130. For instance, the sensor systems 1104-1108 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1104 may be a camera system, the sensor system 1106 may be a LIDAR system, and the sensor system 1108 may be a RADAR system. Other embodiments may include any other number and type of sensors.

AV 130 may also include vehicle actuators, including several mechanical systems 1130-1138 that may be used to maneuver or operate AV 130. For instance, the vehicle actuators may include vehicle propulsion system 1130, braking system 1132, steering system 1134, safety system 1136, and cabin system 1138, among other systems. Vehicle actuators may include vehicle signal lights, vehicle honk, vehicle gear, vehicle doors, etc. Vehicle propulsion system 1130 may include an electric motor, an internal combustion engine, or both. The braking system 1132 may include an engine brake, a wheel braking system (e.g., a disc braking system that utilizes brake pads), hydraulics, actuators, and/or any other suitable componentry configured to assist in decelerating AV 130. The steering system 1134 may include suitable componentry configured to control the direction of movement of the AV 130 during navigation. Safety system 1136 may include lights and signal indicators, a parking brake, airbags, and so forth. The cabin system 1138 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 1138 may include one or more client interfaces (e.g., GUIs, Voice User Interfaces (VUIs), etc.) for controlling certain aspects of the mechanical systems 1130-1138.

AV 130 may additionally include a local computing device 1110 that is in communication with the sensor systems 1104-1108, the mechanical systems 1130-1138, the data center 1150, and the client computing device 1170, among other systems. The local computing device 1110 may include one or more processors and memory, including instructions that may be executed by the one or more processors. The instructions may make up one or more software stacks or components responsible for controlling the AV 130; communicating with the data center 1150, the client computing device 1170, and other systems; receiving inputs from riders, passengers, and other entities within the AV's environment; logging metrics collected by the sensor systems 1104-1108; and so forth. In this example, the local computing device 1110 includes a perception stack 1112, a mapping and localization stack 1114, a planning stack 112, an interface 108, a vehicle control stack 110, a communication stack 1120, an HD geospatial database 1122, and an AV operational database 1124, among other stacks and systems.

Perception stack 1112 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1104-1108, the mapping and localization stack 1114, the HD geospatial database 1122, other components of the AV, and other data sources (e.g., the data center 1150, the client computing device 1170, third-party data sources, etc.). Perception stack 1112 may detect and classify objects and determine their current and predicted locations, speeds, directions, and the like. In addition, the perception stack 1112 may determine the free space around the AV 130 (e.g., to maintain a safe distance from other objects, change lanes, park the AV, etc.). Perception stack 1112 may also identify environmental uncertainties, such as where to look for moving objects, flag areas that may be obscured or blocked from view, and so forth.

Mapping and localization stack 1114 may determine the AV's position and orientation (pose) using different methods from multiple systems (e.g., GPS, IMUs, cameras, LIDAR, RADAR, ultrasonic sensors, the HD geospatial database 1122, etc.). For example, in some embodiments, the AV 130 may compare sensor data captured in real-time by the sensor systems 1104-1108 to data in the HD geospatial database 1122 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning stack 112 may determine how to maneuver or operate the AV 130 safely and efficiently in its environment. For instance, the planning stack 112 may produce a plan for the AV 130, which can include a (reference) trajectory. For example, the planning stack 112 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 130 from one point to another. The planning stack 112 may determine multiple sets of one or more mechanical operations that the AV 130 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 112 may select from multiple backup plans to carry out. For example, while preparing to change lanes to turn right at an intersection, another vehicle may aggressively cut into the destination lane, making the lane change unsafe. The planning stack 112 could have already determined an alternative plan for such an event, and upon its occurrence, help to direct the AV 130 to go around the block instead of blocking a current lane while waiting for an opening to change lanes.

The vehicle control stack 110 may manage the operation of the vehicle propulsion system 1130, the braking system 1132, the steering system 1134, the safety system 1136, and the cabin system 1138. Vehicle control stack 110 may receive a plan from the planning stack 112. The vehicle control stack 110 may receive sensor signals from the sensor systems 1104-1108 as well as communicate with other stacks or components of the local computing device 1110 or a remote system (e.g., the data center 1150) to effectuate the operation of the AV 130. For example, the vehicle control stack 110 may implement the final path or actions from the multiple paths or actions provided by the planning stack 112. The implementation may involve turning the plan from the planning stack 112 into commands for vehicle actuators such as the actuators that control the AV's steering, throttle, brake, and drive unit.

The communication stack 1120 may transmit and receive signals between the various stacks and other components of the AV 130 and between the AV 130, the data center 1150, the client computing device 1170, and other remote systems.

The communication stack 1120 may enable the local computing device 1110 to exchange information remotely over a network. Communication stack 1120 may also facilitate local exchange of information, such as through a wired connection or a local wireless connection.

The HD geospatial database 1122 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 1124 may store raw AV data generated by the sensor systems 1104-1108 and other components of the AV 130 and/or data received by the AV 130 from remote systems (e.g., the data center 1150, the client computing device 1170, etc.). In some embodiments, the raw AV data may include HD LIDAR point cloud data, image or video data, RADAR data, GPS data, and other sensor data that the data center 1150 may use for creating or updating AV geospatial data as discussed further below with respect to FIG. 5 and elsewhere in the present disclosure.

Data center 1150 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1150 may include one or more computing devices remote to the local computing device 1110 for managing a fleet of AVs and AV-related services. For example, in addition to managing the AV 130, the data center 1150 may also support a ridehailing/ridesharing service, a delivery service, a remote/roadside assistance service, street services (e.g., street mapping, street patrol, street cleaning, street metering, parking reservation, etc.), and the like.

The data center 1150 may send and receive various signals to and from the AV 130 and the client computing device 1170. These signals may include sensor data captured by the sensor systems 1104-1108, roadside assistance requests, software updates, ridehailing/ridesharing pick-up and drop-off instructions, and so forth. In this example, the data center 1150 includes one or more of a data management platform 1152, an Artificial Intelligence/Machine Learning (AI/ML) platform 1154, a simulation platform 1156, a remote assistance platform 1158, a ridehailing/ridesharing platform 1160, a map management platform 1162, facility manager 134, among other systems.

Data management platform 1152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridehailing/ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 1150 may access data stored by the data management platform 1152 to provide their respective services.

The AI/ML platform 1154 may provide the infrastructure for training and evaluating machine learning algorithms for operating the AV 130, the simulation platform 1156, the remote assistance platform 1158, the ridehailing/ridesharing platform 1160, the map management platform 1162, and other platforms and systems. Using the AI/ML platform 1154, data scientists may prepare data sets from the data management platform 1152; select, design, and train machine learning models; evaluate, refine, and deploy the models; maintain, monitor, and retrain the models; and so on.

The remote assistance platform 1158 may generate and transmit instructions regarding the operation of the AV 130. For example, in response to an output of the AI/ML platform 1154 or other system of the data center 1150, the remote assistance platform 1158 may prepare instructions for one or more stacks or other components of the AV 130. Remote assistance platform 1158 may include remote assistance 132.

The ridehailing/ridesharing platform 1160 may interact with a customer of a ridehailing/ridesharing service via a ridehailing/ridesharing application 1172 executing on the client computing device 1170. The client computing device 1170 may be any type of computing system, including a server, desktop computer, laptop, tablet, smartphone, smart wearable device (e.g., smart watch; smart eyeglasses or other Head-Mounted Display (HMD); smart car pods or other smart in-car, on-car, or over-ear device; etc.), gaming system, or other general-purpose computing device for accessing the ridehailing/ridesharing application 1172. The client computing device 1170 may be a customer's mobile computing device or a computing device integrated with the AV 130 (e.g., the local computing device 1110). The ridehailing/ridesharing platform 1160 may receive requests to be picked up or dropped off from the ridehailing/ridesharing application 1172 and dispatch the AV 130 for the trip.

Map management platform 1162 may provide a set of tools for the manipulation and management of geographic and spatial (geospatial) and related attribute data. The data management platform 1152 may receive LIDAR point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data. The raw data may be processed, and map management platform 1162 may render base representations (e.g., tiles (2D), bounding volumes (3D), etc.) of the AV geospatial data to enable users to view, query, label, edit, and otherwise interact with the data. Map management platform 1162 may manage workflows and tasks for operating on the AV geospatial data. Map management platform 1162 may control access to the AV geospatial data, including granting or limiting access to the AV geospatial data based on user-based, role-based, group-based, task-based, and other attribute-based access control mechanisms. Map management platform 1162 may provide version control for the AV geospatial data, such as tracking specific changes that (human or machine) map editors have made to the data and to revert changes when necessary. Map management platform 1162 may administer release management of the AV geospatial data, including distributing suitable iterations of the data to different users, computing devices, AVs, and other consumers of HD maps. Map management platform 1162 may provide analytics regarding the AV geospatial data and related data, such as to generate insights relating to the throughput and quality of mapping tasks.

In some embodiments, the map viewing services of map management platform 1162 may be modularized and deployed as part of one or more of the platforms and systems of the data center 1150. For example, the AI/ML platform 1154 may incorporate the map viewing services for visualizing the effectiveness of various object detection or object classification models, the simulation platform 1156 may incorporate the map viewing services for recreating and visualizing certain driving scenarios, the remote assistance platform 1158 may incorporate the map viewing services for replaying traffic incidents to facilitate and coordinate aid, the ridehailing/ridesharing platform 1160 may incorporate the map viewing services into the ridehailing/ridesharing application 1172 to enable passengers to view the AV 130 in transit enroute to a pick-up or drop-off location, and so on.

Exemplary Processor-Based System

Figure 12:
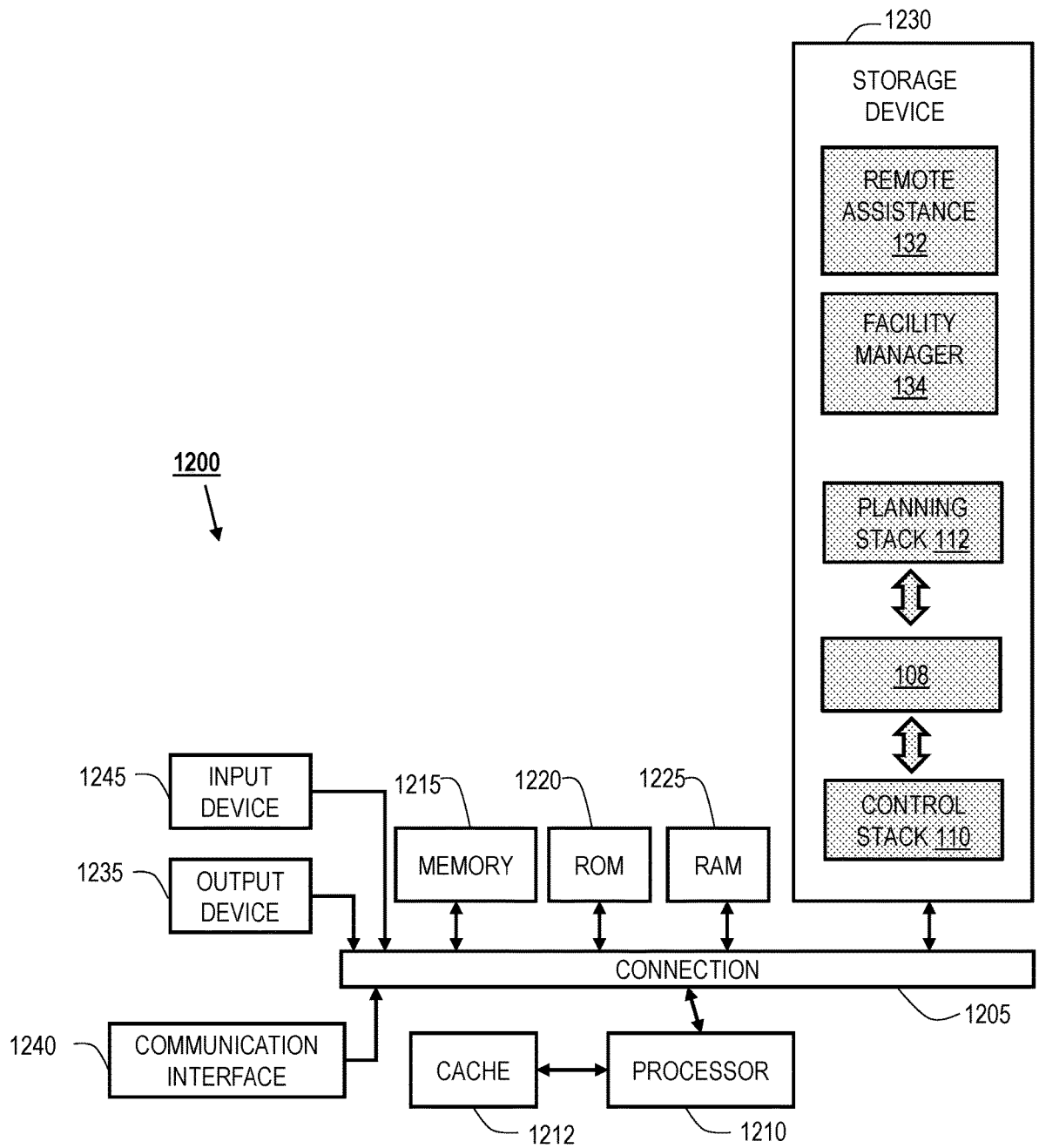
FIG. 12 illustrates an exemplary processor-based system with which some aspects of the subject technology may be implemented.

FIG. 12 illustrates an example processor-based system with which some aspects of the subject technology may be implemented. For example, processor-based system 1200 may be any computing device making up, or any component thereof in which the components of the system are in communication with each other using connection 1205. Connection 1205 may be a physical connection via a bus, or a direct connection into processor 1210, such as in a chipset architecture. Connection 1205 may also be a virtual connection, networked connection, or logical connection.

In some embodiments, computing system 1200 represents the local computing device 610 of FIG. 6. In some embodiments, one or more of the described system components represents many such components each performing some or all of the function for which the component is described. In some embodiments, the components may be physical or virtual devices.

Exemplary system 1200 includes at least one processing unit (Central Processing Unit (CPU) or processor) 1210 and connection 1205 that couples various system components including system memory 1215, such as Read-Only Memory (ROM) 1220 and Random-Access Memory (RAM) 1225 to processor 1210. Computing system 1200 may include a cache of high-speed memory 1212 connected directly with, in close proximity to, or integrated as part of processor 1210.

Processor 1210 may include any general-purpose processor and a hardware service or software service, such as executable instructions that implement functionalities carried out by one or more of remote assistance 132, facility manager 134, planning stack 112, interface 108, and vehicle control stack 110. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc. Computing system 1200 may also include output device 1235, which may be one or more of a number of output mechanisms known to those of skill in the art. In some instances, multimodal systems may enable a user to provide multiple types of input/output to communicate with computing system 1200. Computing system 1200 may include communications interface 1240, which may generally govern and manage the user input and system output. The communication interface may perform or facilitate receipt and/or transmission of wired or wireless communications via wired and/or wireless transceivers.

Storage device 1230 may be a non-volatile and/or non-transitory and/or computer-readable memory device and may be a hard disk or other types of computer-readable media which may store data that is accessible by a computer. Storage device 1230 may include software services, servers, services, etc., that when the code that defines such software is executed by the processor 1210, it causes the system 1200 to perform a function. Storage device 1230 may store executable instructions that implement functionalities carried out by one or more of remote assistance 132, facility manager 134, planning stack 112, interface 108, and vehicle control stack 110. In some embodiments, a hardware service that performs a particular function may include the software component stored in a computer-readable medium in connection with the necessary hardware components, such as processor 1210, connection 1205, output device 1235, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a vehicle comprising: vehicle actuators; one or more processors; and one or more storage media storing instructions executable by the one or more processors to implement a software stack, wherein the software stack includes: a planning stack comprising: a remote vehicle interface to receive relocation commands from a remote requestor; and a plurality of motion planners, wherein the motion planners comprise a freespace planner that produces an output plan involving the vehicle moving forward and in reverse in response to the remote vehicle interface receiving relocation commands, wherein the output plan is provided to the remote requestor; and a vehicle control stack to: receive the output plan from the freespace planner, output commands to the vehicle actuators to carry out the received output plan; and output vehicle controls information, wherein the vehicle controls information is provided to the remote requestor.

In Example 2, the vehicle of Example 1 can optionally include the vehicle controls information being provided to the freespace planner, and the freespace planner producing the output plan based on the vehicle controls information.

In Example 3, the vehicle of Example 1 or 2 can optionally include the remote requestor being a remote assistance platform operated by one or more remote advisors.

In Example 4, the vehicle of Example 1 or 2 can optionally include the remote requestor being a facility manager.

In Example 5, the vehicle of any one of Examples 1-4 can optionally include the motion planners including a structured planner that has more constraints than the freespace planner.

In Example 6, the vehicle of any one of Examples 1-5 can optionally include the output plan comprising a reference trajectory for the vehicle to follow.

In Example 7, the vehicle of any one of Examples 1-6 can optionally include the output plan comprising vehicle actuator requests.

In Example 8, the vehicle of any one of Examples 1-7 can optionally include the output plan comprising timing information.

In Example 9, the vehicle of Example 8 can optionally include the timing information being computed by the freespace planner based on the vehicle controls information received from the vehicle control stack.

In Example 10, the vehicle of any one of Examples 1-9 can optionally include the vehicle controls information comprising a current gear of the vehicle.

In Example 11, the vehicle of any one of Examples 1-10 can optionally include the vehicle controls information comprising a target gear of the vehicle.

In Example 12, the vehicle of any one of Examples 1-11 can optionally include the vehicle controls information comprising a current speed of the vehicle.

In Example 13, the vehicle of any one of Examples 1-12 can optionally include the vehicle controls information comprising gear shifting readiness of the vehicle.

In Example 14, the vehicle of any one of Examples 1-13 can optionally include the vehicle controls information comprising: estimate of gear shifting duration of the vehicle.

Example 15 is a computer-implemented method for generating and providing information to a remote requestor requesting relocation of a vehicle, the relocation involving a multi-point maneuver, comprising: receiving, by a remote vehicle interface implemented on the vehicle, relocation commands from a remote requestor; in response to receiving relocation commands, causing a motion planner of the vehicle to produce an output plan involving the vehicle moving forward and in reverse (e.g., the vehicle performing the multi-point maneuver); receiving, by the vehicle control stack, the output plan; outputting, by the vehicle control stack, commands to vehicle actuators of the vehicle to execute the received output plan; and providing, from the vehicle control stack via the remote vehicle interface, vehicle controls information to the remote requestor.

In Example 16, the computer-implemented method of Example 15 can optionally include the motion planner of the vehicle being a freespace planner.

In Example 17, the computer-implemented method of Example 15 or 16 can optionally include the output plan comprising a reference trajectory for the vehicle to follow.

In Example 18, the computer-implemented method of any one of Examples 15-17 can optionally include the output plan comprising vehicle actuator requests.

In Example 19, the computer-implemented method of any one of Examples 15-18 can optionally include the output plan comprising timing information.

In Example 20, the computer-implemented method of Example 19 can optionally include the timing information being computed by the freespace planner based on vehicle controls information received from the vehicle control stack.

In Example 21, the computer-implemented method of any one of Examples 15-20 can optionally include the vehicle controls information comprising a current gear of the vehicle.

In Example 22, the computer-implemented method of any one of Examples 15-21 can optionally include the vehicle controls information comprising a target gear of the vehicle.

In Example 23, the computer-implemented method of any one of Examples 15-22 can optionally include the vehicle controls information comprising a current speed of the vehicle.

In Example 24, the computer-implemented method of any one of Examples 15-23 can optionally include the vehicle controls information comprising gear shifting readiness of the vehicle.

In Example 25, the computer-implemented method of any one of Examples 15-24 can optionally include the vehicle controls information comprising estimate of gear shifting duration of the vehicle.

Example 26 is a computer-implemented remote assistance platform for relocating a vehicle using a multi-point maneuver, comprising: one or more processors; and one or more storage media storing instructions executable by the one or more processors to implement: a graphical user interface to: display information to a remote advisor, and receive user input from the remote advisor for a relocation session of the vehicle; and a relocation command generator to generate relocation commands based on the user input and to transmit the relocation commands to a remote vehicle interface implemented on the vehicle; wherein the graphical user interface is to further: receive an output plan computed by a planner of the vehicle, wherein the output plan includes the vehicle moving forward and in reverse (e.g., the vehicle performing a multi-point maneuver), display a first shape corresponding to a first segment of the output plan, and display a second shape visually different from the first shape corresponding to a second segment of the output plan.

In Example 27, the computer-implemented remote assistance platform of Example 26 can optionally include the graphical user interface being further to: display a third shape visually different from the first shape and the second shape corresponding to a transition between the first segment and the second segment.

In Example 28, the computer-implemented remote assistance platform of Example 26 or 27 can optionally include the graphical user interface being further to: display a first sequence number corresponding to the first segment of the output plan; and display a second sequence number corresponding to the second segment of the output plan.

In Example 29, the computer-implemented remote assistance platform of any one of Examples 26-28 can optionally include the graphical user interface being further to: display a third sequence number corresponding to a transition between the first segment and the second segment.

In Example 30, the computer-implemented remote assistance platform of any one of Examples 26-29 can optionally include the instructions further implementing an execution time estimator to determine an expected duration for the vehicle to traverse and complete the output plan computed for the relocation session; and the graphical user interface further displaying the expected duration to the remote advisor.

In Example 31, the computer-implemented remote assistance platform of any one of Examples 26-30 can optionally include the instructions further implement an execution time estimator to determine respective expected durations for the vehicle to complete the first and the second segments of the output plan computed for the relocation session; and the graphical user interface further displaying the respective expected durations adjacent to respective shapes in the graphical user interface that correspond to the first and second segments of the output plan.

In Example 32, the computer-implemented remote assistance platform of any one of Examples 26-31 can optionally include the instructions further implement an execution time estimator to determine an expected durations for the vehicle to complete a transition between the first segment and the second segment of the output plan computed for the relocation session; and the graphical user interface further displays the expected duration adjacent to a shape in the graphical user interface that correspond to the transition.

In Example 33, the computer-implemented remote assistance platform of any one of Examples 26-32 can optionally include the graphical user interface being further to: display a fourth shape (e.g., a first semicircular/arc/arch/cone shape) indicating possible target relocation poses in front of the vehicle, and display a fifth shape (e.g., a second semicircular/arc/arch/cone shape) indicating possible target relocation poses behind the vehicle.

In Example 34, the computer-implemented remote assistance platform of any one of Examples 26-33 can optionally include the graphical user interface being further to: receive an indication of a current gear of the vehicle; and display a visual indication indicating the current gear of the vehicle to the remote advisor.

In Example 35, the computer-implemented remote assistance platform of any one of Examples 26-34 can optionally include the graphical user interface being further to: receive an indication of a current speed of the vehicle; and display a visual indication indicating the current speed of the vehicle to the remote advisor.

In Example 36, the computer-implemented remote assistance platform of any one of Examples 26-35 can optionally include the graphical user interface being further to: receive an indication that the vehicle is about to shift to a reverse gear, and display a visual indication indicating the current gear of the vehicle about to shift to the reverse gear.

In Example 37, the computer-implemented remote assistance platform of any one of Examples 26-36 can optionally include the graphical user interface being further to: receive an indication that the vehicle is about to shift to a reverse gear, and display a camera feed corresponding to a camera with a field of view behind the vehicle in response to receiving the indication that the vehicle is about to shift to the reverse gear.

In Example 38, the computer-implemented remote assistance platform of any one of Examples 26-37 can optionally include the graphical user interface being further to: receive an indication that the vehicle is about to shift to a drive gear from a reverse gear; and display a visual indication indicating the current gear of the vehicle about to shift to the drive gear.

In Example 39, the computer-implemented remote assistance platform of any one of Examples 26-38 can optionally include the graphical user interface being further to: remove a camera feed corresponding to a camera with a field of view behind the vehicle in response to receiving an indication that the vehicle is about to shift to the drive gear from the reverse gear.

In Example 40, the computer-implemented remote assistance platform of any one of Examples 26-39 can optionally include the graphical user interface being further to: display a visual indicator conveying information from one or more ultrasonic sensors with a field of view behind the vehicle when the vehicle is in a reverse gear.

In Example 41, the computer-implemented remote assistance platform of any one of Examples 26-40 can optionally include the instructions further implementing a relocation command validation to determine whether the relocation commands generated by the relocation command generator are valid.

In Example 42, the computer-implemented remote assistance platform of any one of Examples 26-41 can optionally include the instructions further implementing a target pose checker to determine whether a target relocation pose is valid.

In Example 43, the computer-implemented remote assistance platform of any one of Examples 26-42 can optionally include the instructions further implementing a computed output plan checker to determine whether the output plan is valid.

Example 44 is a computer-implemented method to visualize and manage a relocation session for a vehicle, the method comprising: displaying, through a graphical user interface, information to a remote advisor; receiving, through the graphical user interface, user input from the remote advisor for the relocation session; generating, by a relocation command generator, relocation commands based on the user input; transmitting the relocation commands to a remote vehicle interface implemented on the vehicle; receiving an output plan computed by a planner of the vehicle, wherein the output plan involves the vehicle moving forward and in reverse; displaying a first shape corresponding to a first segment of the output plan; and displaying a second shape visually different from the first shape corresponding to a second segment of the output plan.

In Example 45, the computer-implemented method of Example 44 can optionally include: displaying a third shape visually different from the first shape and the second shape corresponding to a transition between the first segment and the second segment.

In Example 46, the computer-implemented method of Example 44 or 45 can optionally include displaying a first sequence number corresponding to the first segment of the output plan; and displaying a second sequence number corresponding to the second segment of the output plan.

In Example 47, the computer-implemented method of any one of Examples 44-46 can optionally include displaying a third sequence number corresponding to a transition between the first segment and the second segment.

In Example 48, the computer-implemented method of any one of Examples 44-47 can optionally include: determining an expected duration for the vehicle to traverse and complete the output plan computed for the relocation session; and displaying the expected duration to the remote advisor.

In Example 49, the computer-implemented method of any one of Examples 44-48 can optionally include: determining respective expected durations for the vehicle to complete the first and second segments of the output plan computed the relocation session; and displaying the respective expected durations adjacent to respective shapes in the graphical user interface that correspond to the first and second segments of the output plan.

In Example 50, the computer-implemented method of any one of Examples 44-49 can optionally include: determining an expected duration for the vehicle to complete a transition between the first segment and the second segment of the output plan computed the relocation session; and displaying the expected duration adjacent to a shape in the graphical user interface that correspond to the transition between the first segment and the second segment of the output plan.

In Example 51, the computer-implemented method of any one of Examples 44-50 can optionally include: displaying a fourth shape indicating possible target relocation poses in front of the vehicle, and display a fifth shape indicating possible target relocation poses behind the vehicle.

In Example 52, the computer-implemented method of any one of Examples 44-51 can optionally include: displaying a visual indicator conveying information from one or more ultrasonic sensors with a field of view behind the vehicle.

In Example 53, the computer-implemented method of any one of Examples 44-52 can optionally include: determining whether the relocation commands generated by the relocation command generator are valid.

In Example 54, the computer-implemented method of any one of Examples 44-53 can optionally include: determining whether a target relocation pose provided in the user input from the remote advisor is within a first allowed region in front of the vehicle and a second allowed region behind the vehicle.

In Example 55, the computer-implemented method of any one of Examples 44-54 can optionally include determining whether the output plan includes the vehicle reversing in or into an intersection.

Example 56 includes one or more non-transitory computer-readable media storing instructions that, when executed by one or more processors, cause the one or more processors to perform any one of the computer-implemented methods of Examples 15-25 and 44-55.

Example 57 is an apparatus comprising means to carry out any one of the computer-implemented methods of Examples 15-25 and 44-55.

What is claimed is:

1. A vehicle comprising:
   vehicle actuators;
   one or more processors; and
   one or more storage media storing instructions executable by the one or more processors to implement a software stack, wherein the software stack includes:
   a planning stack comprising:
      a remote vehicle interface to receive relocation commands from a remote requestor; and
      a plurality of motion planners, wherein the motion planners comprise at least a freespace planner that produces an output plan involving the vehicle moving through multiple segments of a multi-point maneuver in response to the remote vehicle interface receiving relocation commands, wherein moving through the multiple segments includes moving forward and in reverse, wherein the output plan is provided to the remote requestor; and
   a vehicle control stack to:
      receive the output plan from the freespace planner,
      output commands to the vehicle actuators to carry out the received output plan; and
      output vehicle controls information, wherein the vehicle controls information is provided to the remote requestor; and
   a graphical user interface to:
      display a first shape corresponding to a first segment of the output plan,
      display a second shape visually different from the first shape corresponding to a second segment of the output plan,
      display a first semicircular shape indicating possible target relocation poses in front of the vehicle, and
      display a second semicircular shape indicating possible target relocation poses behind the vehicle.

2. The vehicle of claim 1, wherein the vehicle controls information is provided to the freespace planner, and the freespace planner produces the output plan based on the vehicle controls information.

3. The vehicle of claim 1, wherein the motion planners further include a structured planner that has more constraints than the freespace planner.

4. The vehicle of claim 1, wherein the output plan comprises timing information.

5. The vehicle of claim 4, wherein the timing information is computed by the freespace planner based on the vehicle controls information received from the vehicle control stack.

6. The vehicle of claim 1, wherein the vehicle controls information comprises one or more of: a current gear of the vehicle, a target gear of the vehicle, a current speed of the vehicle, gear shifting readiness of the vehicle, and estimate of gear shifting duration of the vehicle.

7. A computer-implemented remote assistance platform for relocating a vehicle using a multipoint maneuver, comprising:
one or more processors; and
one or more storage media storing instructions executable by the one or more processors to implement:
a graphical user interface to:
display information to a remote advisor, and
receive user input from the remote advisor for a relocation session of the vehicle; and
a relocation command generator to generate relocation commands based on the user input and to transmit the relocation commands to a remote vehicle interface implemented on the vehicle;
wherein the graphical user interface is to further:
receive an output plan computed by a planner of the vehicle, wherein the output plan includes the vehicle moving through multiple segments of a multi-point maneuver, wherein moving through the multiple segments includes moving forward and in reverse forward and in reverse,
display a first shape corresponding to a first segment of the output plan, and display a second shape visually different from the first shape corresponding to a second segment of the output plan,
display a first semicircular shape indicating possible target relocation poses in front of the vehicle, and
display a second semicircular shape indicating possible target relocation poses behind the vehicle.

8. The computer-implemented remote assistance platform of claim 7, wherein the graphical user interface is further to:
display a third shape visually different from the first shape and the second shape corresponding to a transition between the first segment and the second segment.

9. The computer-implemented remote assistance platform of claim 7, wherein the graphical user interface is further to:
display a first sequence number corresponding to the first segment of the output plan; and display a second sequence number corresponding to the second segment of the output plan.

10. The computer-implemented remote assistance platform of claim 9, wherein the graphical user interface is further to:
display a third sequence number corresponding to a transition between the first segment and the second segment.

11. The computer-implemented remote assistance platform of claim 7, wherein:
the instructions further implement an execution time estimator to determine an expected duration for the vehicle to traverse and complete the output plan computed for the relocation session; and
the graphical user interface further displays the expected duration to the remote advisor.

12. The computer-implemented remote assistance platform of claim 7, wherein:
the instructions further implement an execution time estimator to determine respective expected durations for the vehicle to complete the first and second segments of the output plan computed for the relocation session; and
the graphical user interface further displays the respective expected durations adjacent to respective shapes in the graphical user interface that correspond to the first and second segments of the output plan.

13. The computer-implemented remote assistance platform of claim 7, wherein:
the instructions further implement an execution time estimator to determine expected durations for the vehicle to complete a transition between the first segment and the second segment of the output plan computed for the relocation session; and
the graphical user interface further displays the expected durations adjacent to a shape in the graphical user interface that correspond to the transition.

14. The computer-implemented remote assistance platform of claim 7, wherein the graphical user interface is further to:
display a camera feed corresponding to a camera with a field of view behind the vehicle in response to receiving an indication that the vehicle is about to shift to a reverse gear.

15. The computer-implemented remote assistance platform of claim 7, wherein the graphical user interface is further to:
remove a camera feed corresponding to a camera with a field of view behind the vehicle in response to receiving an indication that the vehicle is about to shift to a drive gear from a reverse gear.

16. The computer-implemented remote assistance platform of claim 7, wherein the graphical user interface is further to:
display a visual indicator conveying information from one or more ultrasonic sensors with a field of view behind the vehicle when the vehicle is in a reverse gear.

17. The computer-implemented remote assistance platform of claim 7, wherein:
the instructions further implement a relocation command validation to determine whether the relocation commands generated by the relocation command generator are valid.

18. The computer-implemented remote assistance platform of claim 7, wherein:
the instructions further implement a target pose checker to determine whether a target relocation pose is valid.

19. A computer-implemented method to visualize and manage a relocation session for a vehicle, the method comprising:
displaying, through a graphical user interface, information to a remote advisor,
receiving, through the graphical user interface, user input from the remote advisor for the relocation session;
generating, by a relocation command generator, relocation commands based on the user input;
transmitting the relocation commands to a remote vehicle interface implemented on the vehicle;
receiving an output plan computed by a planner of the vehicle, wherein the output plan involves the vehicle moving forward and in reverse;
displaying a first shape corresponding to a first segment of the output plan;
displaying a second shape visually different from the first shape corresponding to a second segment of the output plan;
displaying a first semicircular shape indicating possible target relocation poses in front of the vehicle, and
displaying a second semicircular shape indicating possible target relocation poses behind the vehicle.

* * * * *